US009361304B2

(12) United States Patent
Hobart et al.

(10) Patent No.: US 9,361,304 B2
(45) Date of Patent: Jun. 7, 2016

(54) AUTOMATED DATA PURGE IN AN ELECTRONIC DISCOVERY SYSTEM

(71) Applicant: Bank of America Corporation, Charlotte, NC (US)

(72) Inventors: Eric B. Hobart, La Center, WA (US); John N. Whalen, Cornelius, NC (US); Michael J. Richardson, Chicago, IL (US); Kellie H. Hudson, Salisbury, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 149 days.

(21) Appl. No.: 13/901,249

(22) Filed: May 23, 2013

(65) Prior Publication Data

US 2014/0351201 A1    Nov. 27, 2014

(51) Int. Cl.
*G06F 17/30*    (2006.01)

(52) U.S. Cl.
CPC .............................. *G06F 17/30085* (2013.01)

(58) Field of Classification Search
CPC .................. G06F 17/30575; G06F 17/30289; G06F 17/30212; G06F 17/30215; G06F 17/30368; G06F 17/30578; G06F 17/30581; G06F 17/30085
USPC ........................................................ 707/603
See application file for complete search history.

(56) References Cited

U.S. PATENT DOCUMENTS

| 6,678,700 | B1 * | 1/2004 | Moore et al. | |
| 8,554,762 | B1 * | 10/2013 | O'Neill et al. | 707/715 |
| 2002/0049776 | A1 * | 4/2002 | Aronoff et al. | 707/200 |
| 2004/0148397 | A1 * | 7/2004 | Aronoff et al. | 709/227 |
| 2004/0230572 | A1 * | 11/2004 | Omoigui | 707/3 |
| 2009/0254572 | A1 * | 10/2009 | Redlich et al. | 707/10 |
| 2010/0070448 | A1 * | 3/2010 | Omoigui | 706/47 |
| 2010/0250497 | A1 * | 9/2010 | Redlich et al. | 707/661 |
| 2011/0320404 | A1 * | 12/2011 | Akulavenkatavara et al. | 707/622 |
| 2012/0150803 | A1 * | 6/2012 | Zhu et al. | 707/638 |
| 2012/0317082 | A1 * | 12/2012 | Anwar et al. | 707/692 |

\* cited by examiner

*Primary Examiner* — Hosain Alam
*Assistant Examiner* — Saba Ahmed
(74) *Attorney, Agent, or Firm* — Michael A. Springs; Moore & Van Allen PLLC; James C. Edwards

(57) ABSTRACT

Embodiments of the invention relate to systems, methods, and computer program products for automated data purge in an e-discovery system. The automated data purge process determines files within an e-discovery file system that qualify for purging based on one or more purge policies, locates the files within the file system and automatically purges the data from the file system. Additional embodiments provide for automatically creating log entries that track the details of the purge and automatically generating and communicating alerts/messages that notify concerned parties of the data purge. As such the present invention is able to accurately and automatically purge data from an electronic discovery file system and provide for detailed purge data tracking, as well as, purge notification.

15 Claims, 13 Drawing Sheets

US 9,361,304 B2

AUTOMATED DATA PURGE IN AN ELECTRONIC DISCOVERY SYSTEM

FIELD

In general, embodiments of the invention relate to methods, systems, apparatus and computer program products for electronic discovery (e-discovery) and, more particularly, for automated file purge system that applies business rules to determine what data needs to be purged, locates the data in the e-discovery file system based on purge criteria and automatically purges the data from the file system.

BACKGROUND

Electronic discovery, commonly referred to as e-discovery, refers to any process in which electronic data is sought, located, secured and searched with the intent of using it as evidence in a legal proceeding, an audit, a securities investigation, a forensics investigation or the like. E-discovery can be carried out offline on a particular computer or it can be accomplished in a network environment.

The nature of digital data makes it extremely well-suited for investigation. In particular, digital data can be electronically searched with ease, whereas paper documents must be scrutinized manually. Furthermore, digital data is difficult or impossible to completely destroy, particularly if the data is stored in a network environment. This is because the data appears on multiple hard drives, and because digital files, even if deleted, generally can be undeleted. In fact, the only reliable means of destroying digital data is to physically destroy any and all hard drives where it is stored.

In the process of electronic discovery, data of all types can serve as evidence. This can include text, image, calendar event data, databases, spreadsheets, audio files, multimedia files, web sites and computer programs. Electronic mail (i.e., e-mail) can be an especially valuable source of evidence in civil or criminal litigation, because people are often less careful in these exchanges than in hard copy correspondence such as written memos or postal letters.

E-discovery is an evolving field that goes far beyond mere technology. It gives rise to multiple issues, many of which have yet to be resolved. For example, e-discovery in large corporate or enterprise environments, which may have multitude of cases ongoing at any one point in time, results in an enormous amount of data that is required to be stored. Such a high volume data storage requirement means that corporations and/or enterprises have to support an extensive infrastructure of storage capacity. This issue is exasperated, in that, internal or external (e.g., government regulatory) compliance rules dictate that certain data be stored for a predetermined period of time after a case or matter has been closed. Moreover, while corporations and enterprises may out-source actual data storage to third-party entities, the corporations and enterprises typically feel a need to retain internal storage of those files or data stored at third party entities for a predetermined period of time. Additionally, the processing of data throughout the overall e-discovery process typically results in what is referred to herein, as "work product"; data files that include redundant data, corrupt data or the like, which may be kept in storage while a case is active but may no longer be required to be stored once the case has closed.

While corporations and enterprises can choose to permanently retain the data, such data retention policies not only require an ever increasing amount of storage capacity but also pose a security/exposed data risk. Therefore, most corporations and/or enterprises implement data destruction (i.e., purge) policies that dictate that data be systematically and permanently removed from storage based on pre-defined purge rules and/or criteria. In large corporations or enterprises in which different business entities, lines-of-business or the like may define their own data destruction/purge rules, the management of such data purging can be a daunting task. Manual purging of data has proven to be an inefficient process, which can result in either erroneous data being purged or the failure to purge data that otherwise requires such. Up until now, automated purging within the context of e-discovery data has been limited to purging at the case level, in other words, all the data associated with a specified case is purged at a specified time (i.e., an entire database of data is purged). Such purging does not readily provide for individual business rules to be applied based on the requirements of different business entities, lines-of-business or the like within the corporation or business entity nor does it allow for progressive purging of files within a case based on purge policies applicable at the file level.

Therefore, a need exists to provide for a precise, efficient and accurate system for purging data within an electronic discovery system. The desired system should provide for determining which cases within the e-discovery system are currently eligible for purge based on predefined purge criteria, which may be defined at the business unit/line-of business level. Once cases are identified, the desired system should be capable of purging only those files within the case that meet predetermined purge policies. In addition, the desired system should provide for automated and comprehensive post-purge tracking of the purge process, as well as, automated notification of parties concerned with the purge process.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for electronic discovery and, in particular, provide for an automated file purge system that (1) determines files within an e-discovery file system that qualify for purging based on one or more purge policies (i.e., business rules), (2) locates the files within the file system and (3) automatically purges the data from the file system. In specific embodiments purge-eligible cases are determined based on business rules and files associated with the cases that meet the policies are determined and located by accessing a metadata database. In other embodiments, files are determined and located based on performing a scan of an e-discovery system file directory based on a predetermined naming convention. Additional embodiments provide for automatically creating log entries that track the details of the purge and automatically generating and communicating alerts/messages that notify concerned parties of the data purge. As such the present invention is able to accurately and automatically purge data from an electronic discovery file system. In addition, the present invention provides for detailed tracking purge data, as well as, purge notification.

An apparatus for automated data purge in an electronic discovery (e-discovery) system defines first embodiments of the invention. The apparatus includes a computing platform having a memory and at least one processor in communication with the memory. The apparatus further includes a data purge application stored in the memory and executable by the processor. The data purge application is configured to (1) determine files within an e-discovery file system that qualify for purging based on identified purge policies, (2) locate the files within the e-discovery file system, and (3) purge data in the located files from the e-discovery file system.

In specific embodiments of the apparatus the data purge application is further configured to determine one or more purge-eligible cases based on applying predetermined purge criteria (i.e., business rules) to the cases existing the e-discovery system and determine the files from within the purge-eligible cases. In such embodiments of the apparatus the data purge application may be further configured to determine the one or more purge-eligible cases by querying an e-discovery system metadata database with the predetermined purge criteria to determine the one or more purge-eligible cases.

In other specific embodiments of the apparatus the data purge application is further configured to locate the files by querying an e-discovery system metadata database with the one or more purge policies to determine storage locations within the e-discovery file system that store the files that qualify for purging. The purge policies may include, but are not limited to, (1) purging work product data based on an associated case being closed, (2) purging data from a closed case after a predetermined period of time, and (3) purging data additionally stored at an external repository after a predetermined period of time.

In other specific embodiments of the apparatus the data purge application is further configured to determine the files by scanning an e-discovery system file directory based on a predetermined naming convention, such as folder names based on a creation date to identify files that qualify for purging (e.g., folders/files that are older than a predetermined period of time).

In still further embodiments of the apparatus the data purge application is further configured to determine files that qualify for purging based on the identified purge policies and one or more exceptions to the purge policies. Exceptions may be based on, but are not limited to, case, custodian, data type, data source, personal storage device, network-share storage device or the like.

In specific embodiments of the apparatus the data purge application is further configured to, in response to purging the data, update the e-discovery file system to reflect that the data has been purged. In such embodiments, the data purge application is further configured to create a purge entry in a file system log that includes details of the data purge. The details in the purge entry, may include, but are not limited to, identification of the data purged, date and time of data purge, identification of purge policy applied, and file system location of data purged.

In other specific embodiments of the apparatus the data purge application is further configured to, in response to purging the data, update metadata, (1) stored in an e-discovery system metadata database and (2) associated with the purged files, to indicate that the data has been purged and is no longer accessible.

Moreover, in other embodiments of the apparatus the data purge application is further configured to, in response to purging the data, generate and initiate communication of a purge alert that notifies recipients of one or more of an identity of the data purged, a time at which the data was purged, an amount of data purged, an amount of storage capacity reclaimed.

A method for automated data purge in an electronic discovery (e-discovery) system defines second embodiments of the invention. The method includes identifying one or more purge policies to apply to current data purge processing and executing, by a computing device processor, the current data purge processing. The data purge processing includes (1) determining files within an e-discovery file system that qualify for purging based on the identified one or more purge policies, (2) locating the files within the e-discovery file system, and (3) purging data in the located files from the e-discovery file system.

In specific embodiments the method further includes (1) determining purge-eligible cases based on applying purge criteria to the cases existing in the e-discovery system and (2) identifying one or more the purge-eligible cases as requiring current data purge processing. In such embodiments of the method determining the files further includes determining the files from within the identified purge-eligible cases. Moreover, in such embodiments of the method, determining purge-eligible cases includes querying an e-discovery system metadata database with the predetermined purge criteria to determine the one or more purge-eligible cases.

In additional embodiments of the method locating the files further includes querying an e-discovery system metadata database with the identified one or more purge policies to determine storage locations within the e-discovery file system that store the files that are determined to qualify for purging. The purge policies may include, but are not limited to, (1) purging work product data based on an associated case being closed, (2) purging data from a closed case after a predetermined period of time, and (3) purging data additionally stored at an external repository after a predetermined period of time.

In other embodiments of the method determining the files further includes scanning an e-discovery system file directory to identify the files that qualify for purging. The Scanning is based on a predetermined naming convention, such as folder names based on a creation date or the like.

In still further embodiments the method includes identifying one or more exceptions to the purge policies. In such embodiments of the method determining files further includes determining the files that qualify for purging based on the identified purge policies and the one or more exceptions. Exceptions may be based on, but are not limited to, case, custodian, data type, data source, personal storage device, network-share storage device or the like.

In further specific embodiments of the method, executing the current purge processing further includes, in response to purging the data, updating the e-discovery file system to reflect that the data has been purged. In such embodiments updating may further include creating a purge entry in a file system log that includes details of the data purge. The details in the purge entry may include, but are not limited to, identification of the data purged, date and time of data purge, identification of purge policy applied, and file system location of data purged.

In additional specific embodiments of the method, executing the current purge processing further includes, in response to purging the data, updating metadata stored in an e-discovery system metadata database and associated with the purged files to indicate that the data has been purged and is no longer accessible.

Moreover, in additional specific embodiments of the method, executing the current purge processing further includes, in response to purging the data, generating and initiation communication of a purge alert that notifies recipients of one or more of an identity of the data purged, a time at which the data was purged, an amount of data purged, an amount of storage capacity reclaimed.

A computer program product including a non-transitory computer-readable medium having computer readable program code defines third embodiments of the invention. The computer-readable program code includes a first set of codes for causing a computing processor to determine files within an e-discovery file system that qualify for purging based on one or more purge policies. In addition the computer-readable code includes a second set of codes for causing a computing processor to locate the files within the e-discovery file system and a third set of codes for causing a computing processor to purge data in the located files from the e-discovery file system.

Thus, further details are provided below for systems, apparatus, methods and computer program products for automated data purge in an e-discovery system. The automated data purge of the present invention (1) determines files within an e-discovery file system that qualify for purging based on one or more purge policies (i.e., business rules), (2) locates the files within the file system and (3) automatically purges the data from the file system. In specific embodiments purge-eligible cases are determined based on business rules and files associated with the cases that meet the policies are determined and located by accessing a metadata database. In other embodiments, files are determined and located based on performing a scan of an e-discovery system file directory based on a predetermined naming convention. Additional embodiments provide for automatically creating log entries that track the details of the purge and automatically generating and communicating alerts/messages that notify concerned parties of the data purge. As such the present invention is able to accurately and automatically purge data from an electronic discovery file system. In addition, the present invention provides for detailed tracking purge data, as well as, purge notification.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
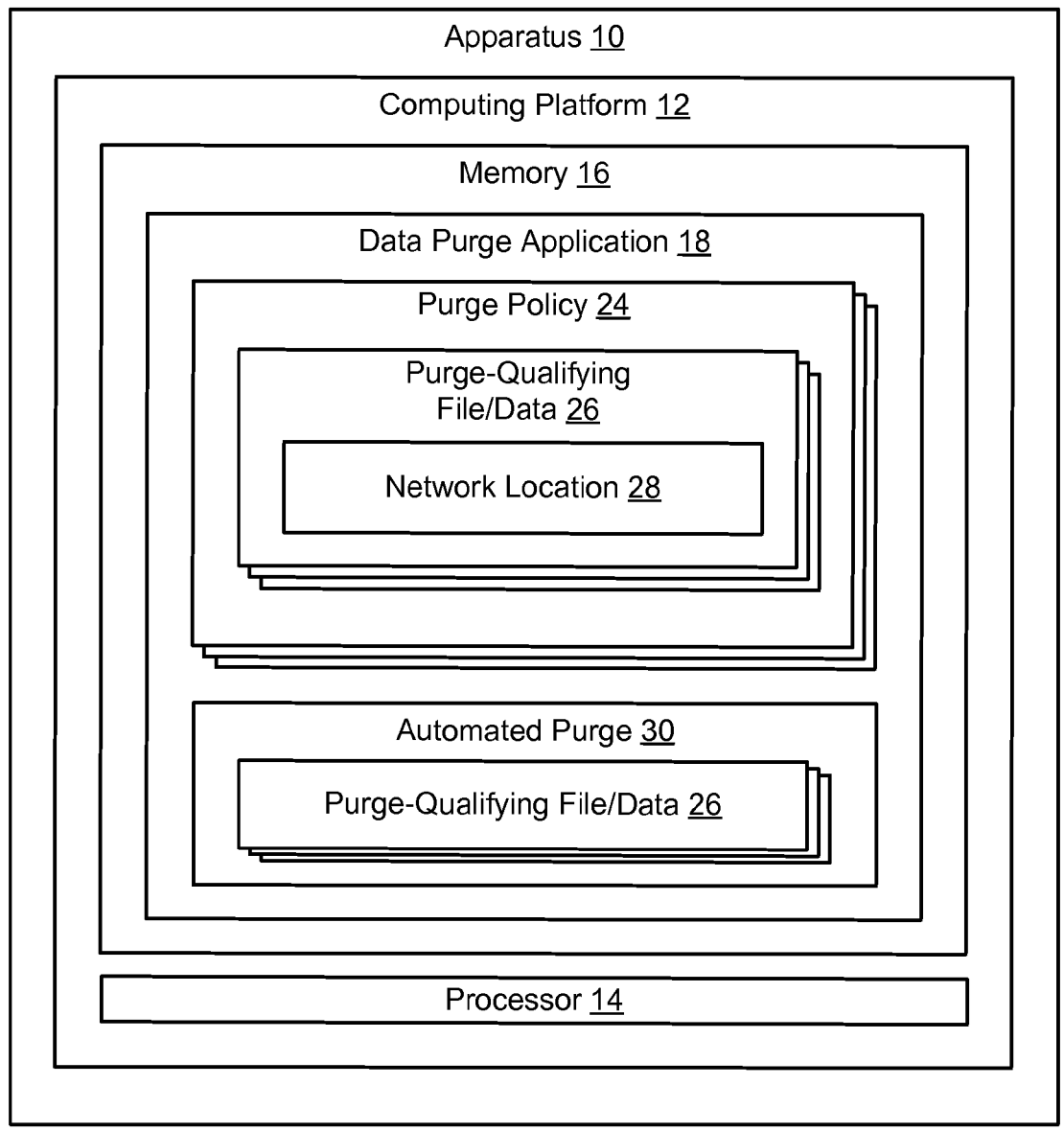
Figure 2:
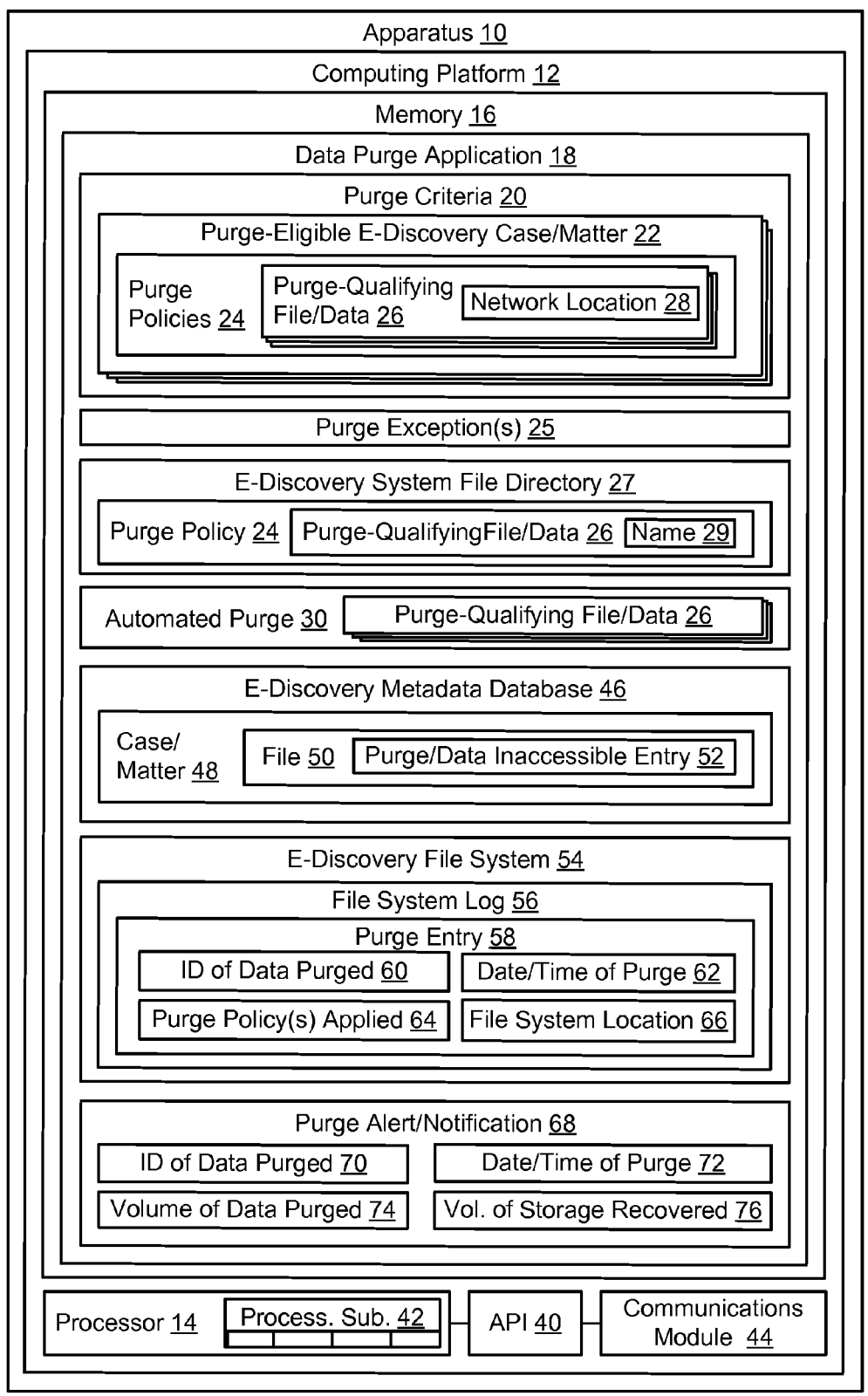
Figure 3:
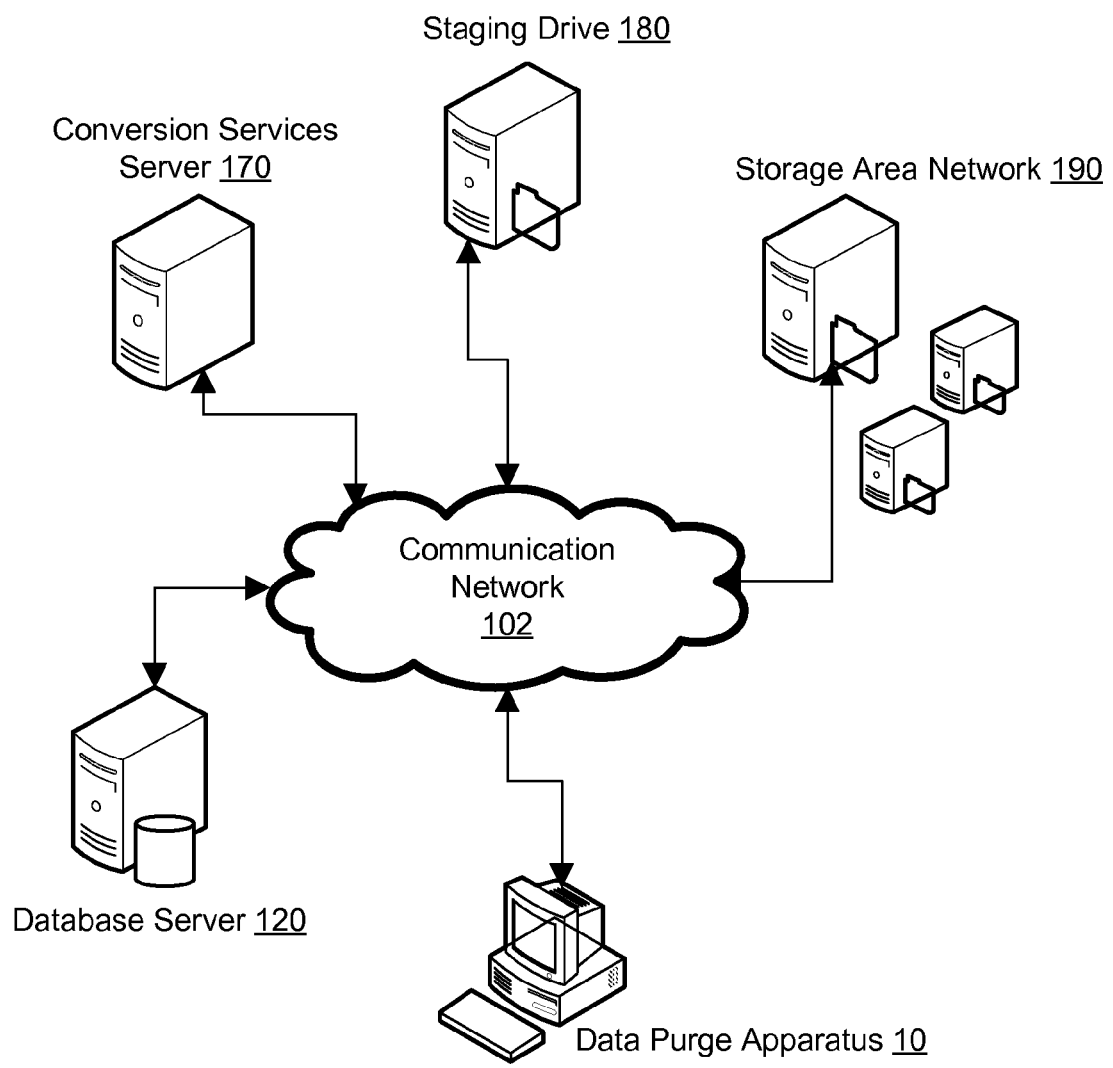
Figure 4:
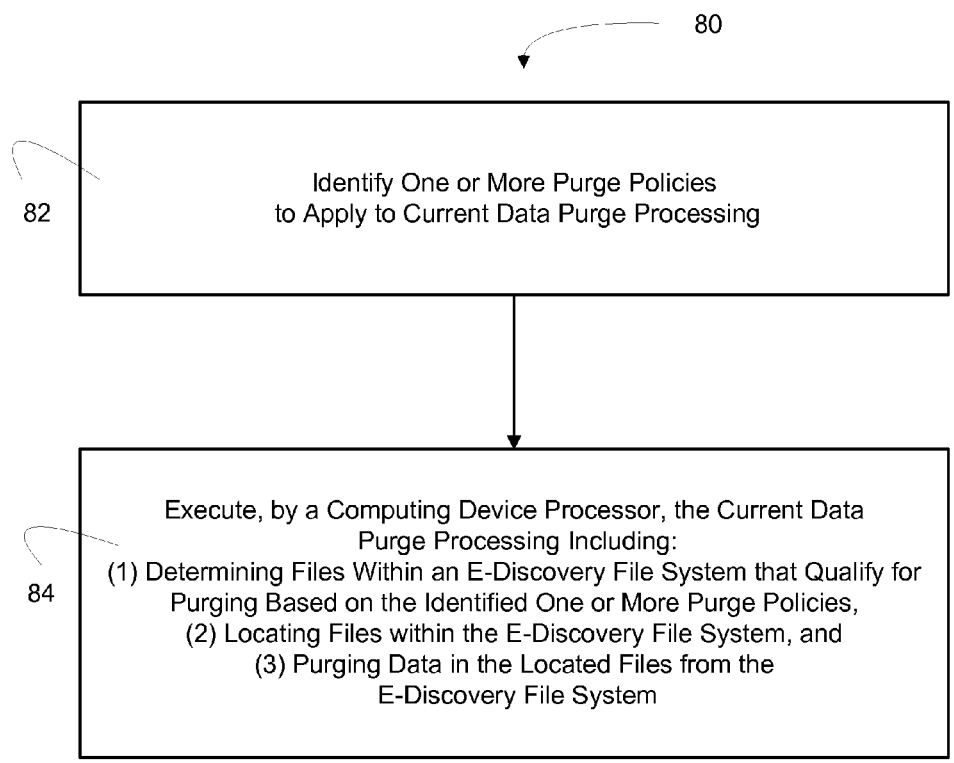
Figure 5:
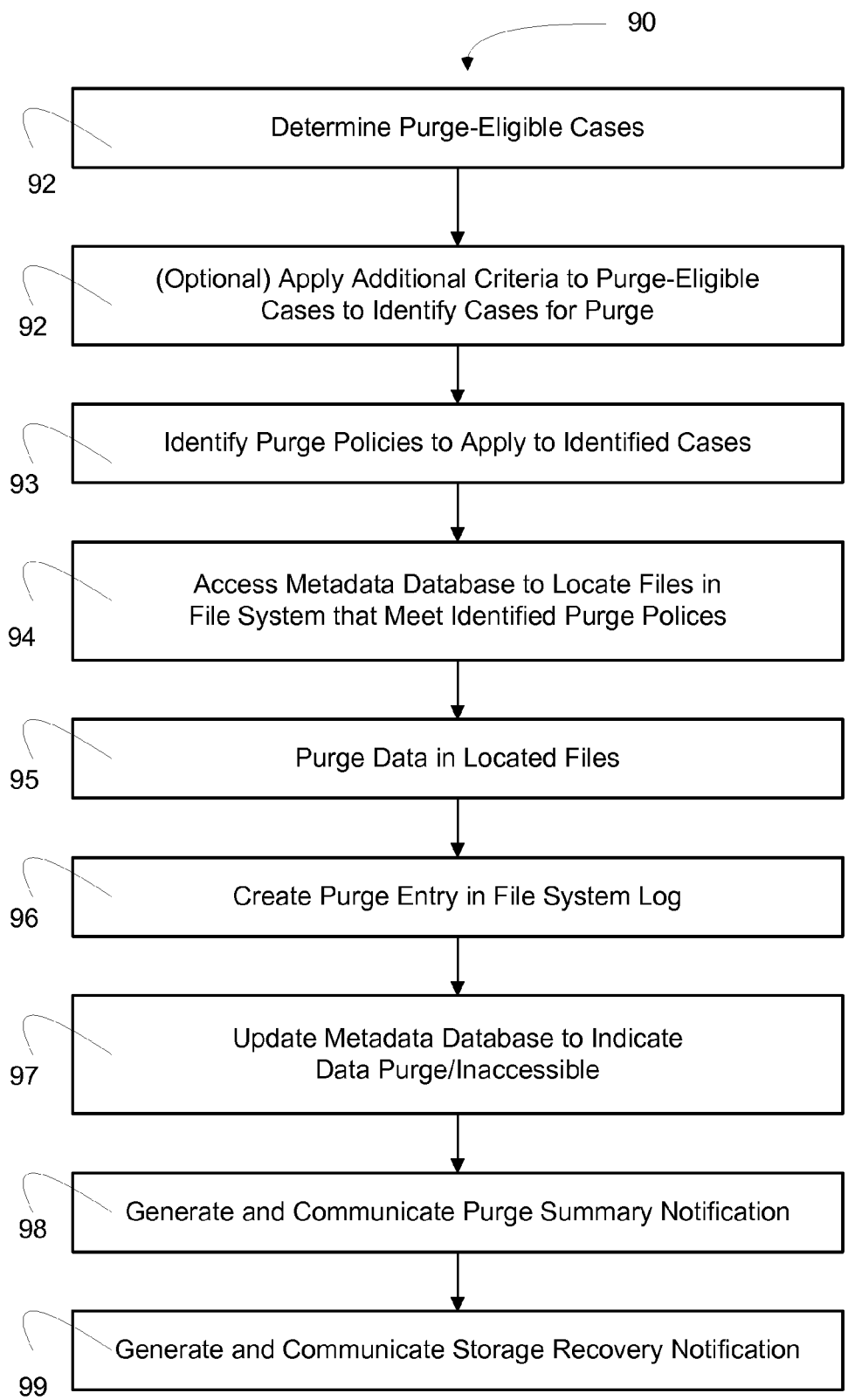
Figure 6:
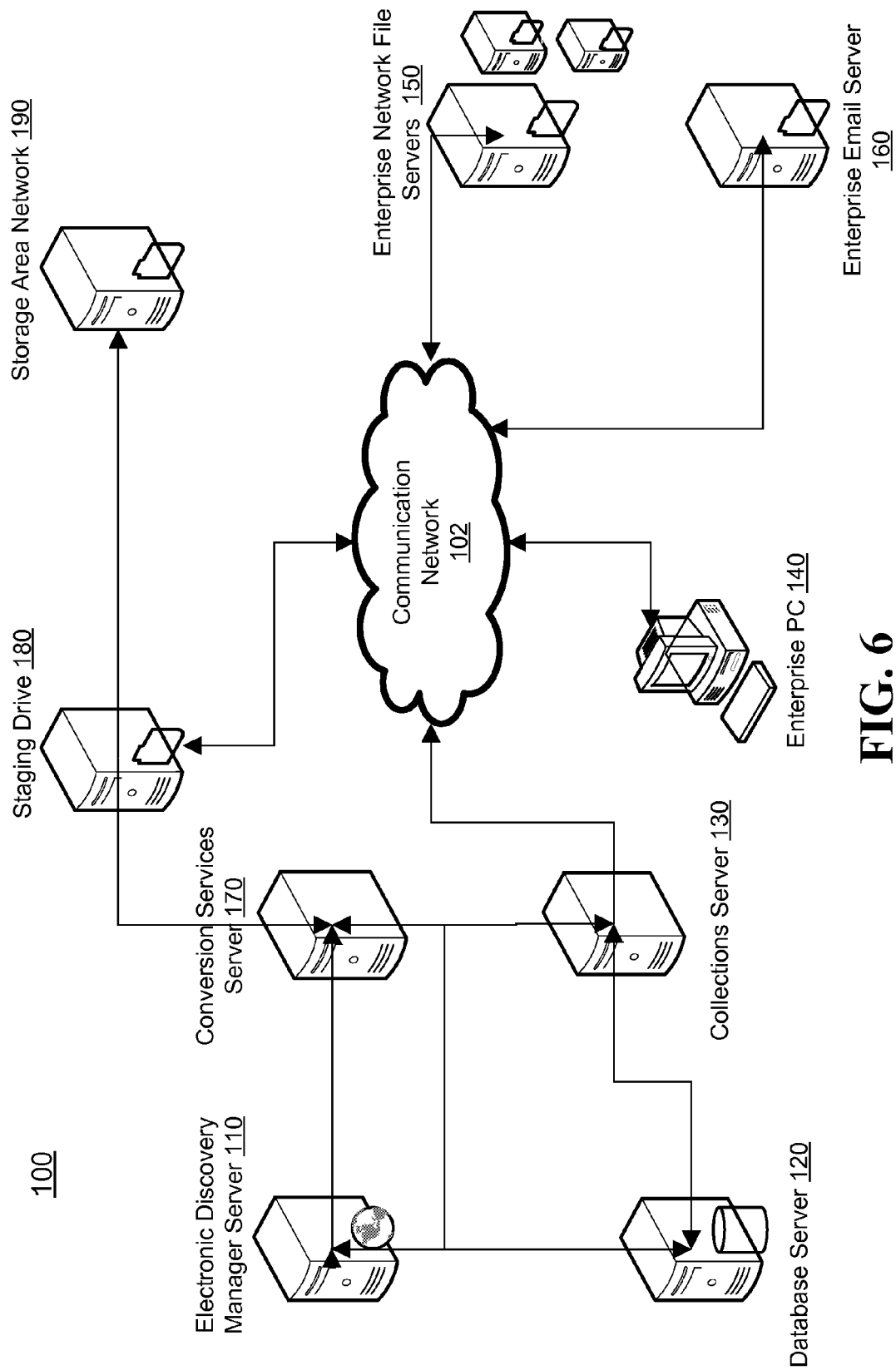
Figure 7:
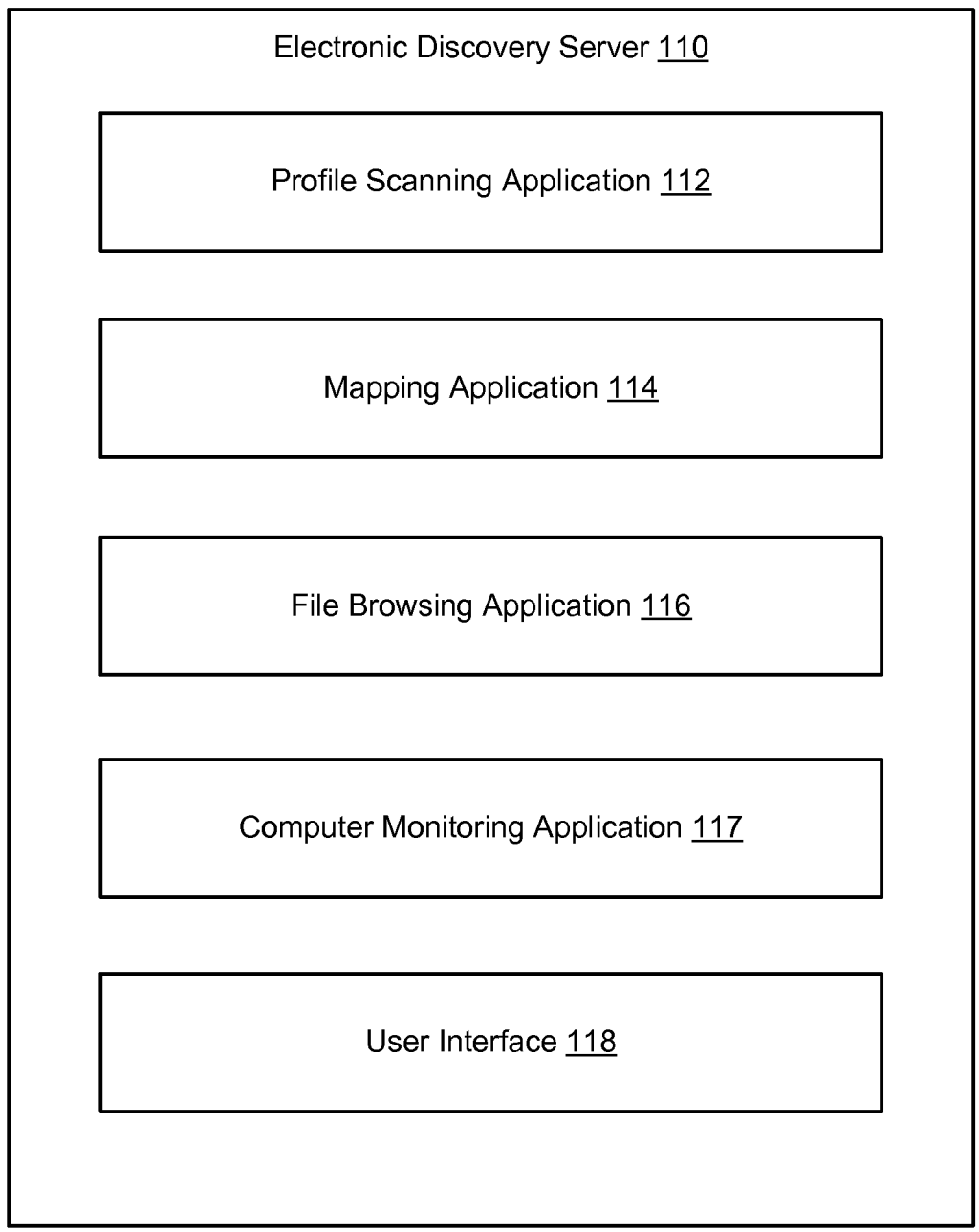
Figure 8:
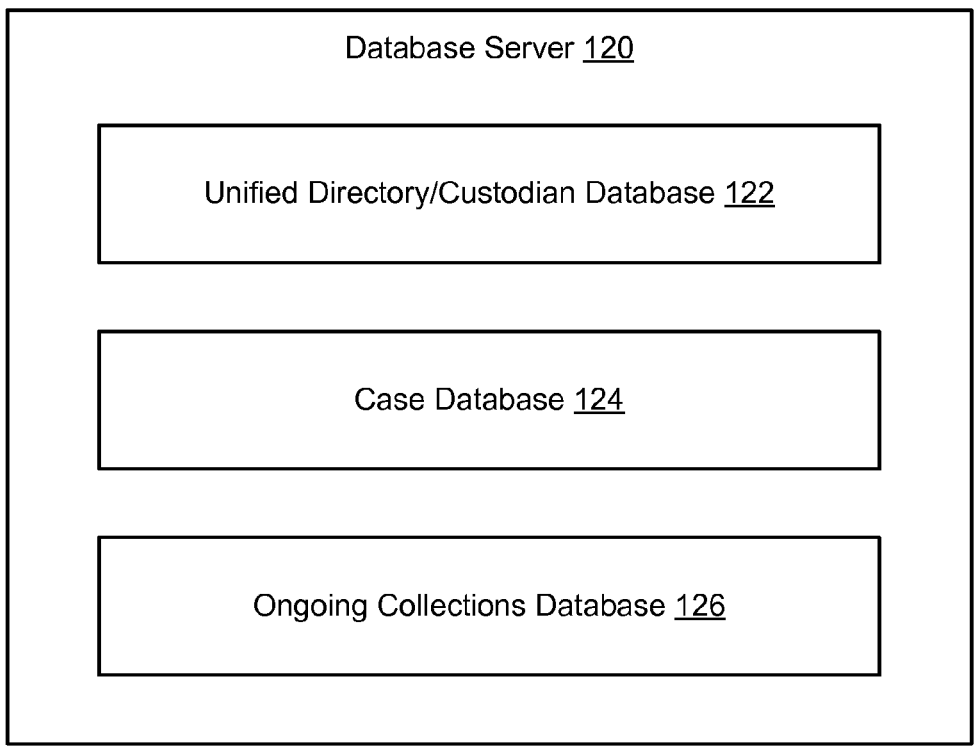
Figure 9:
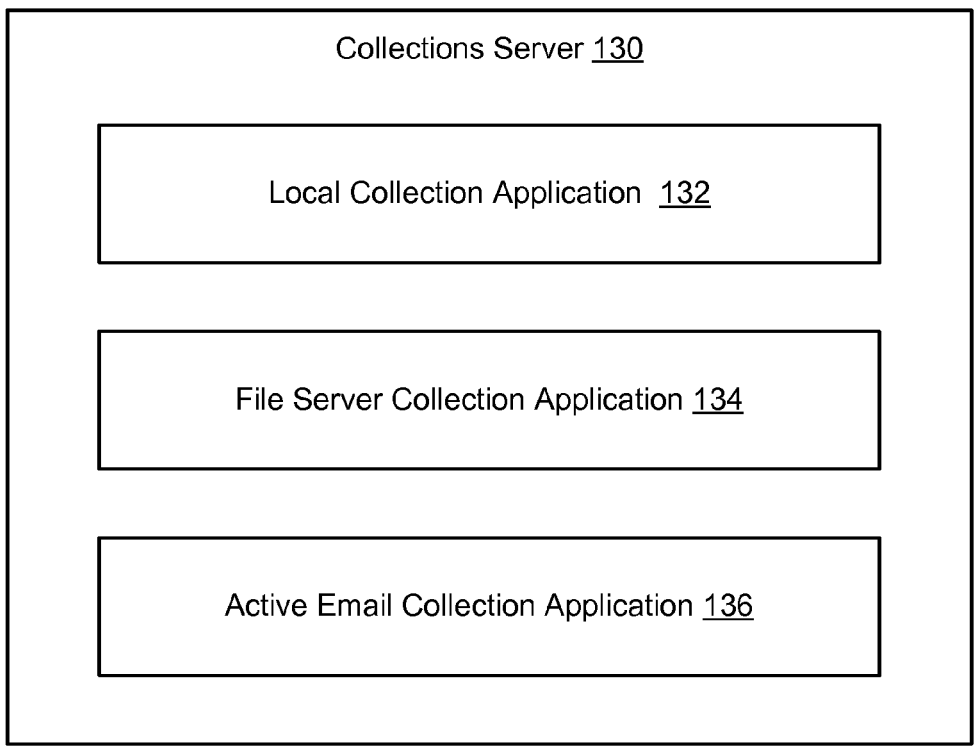
Figure 10:
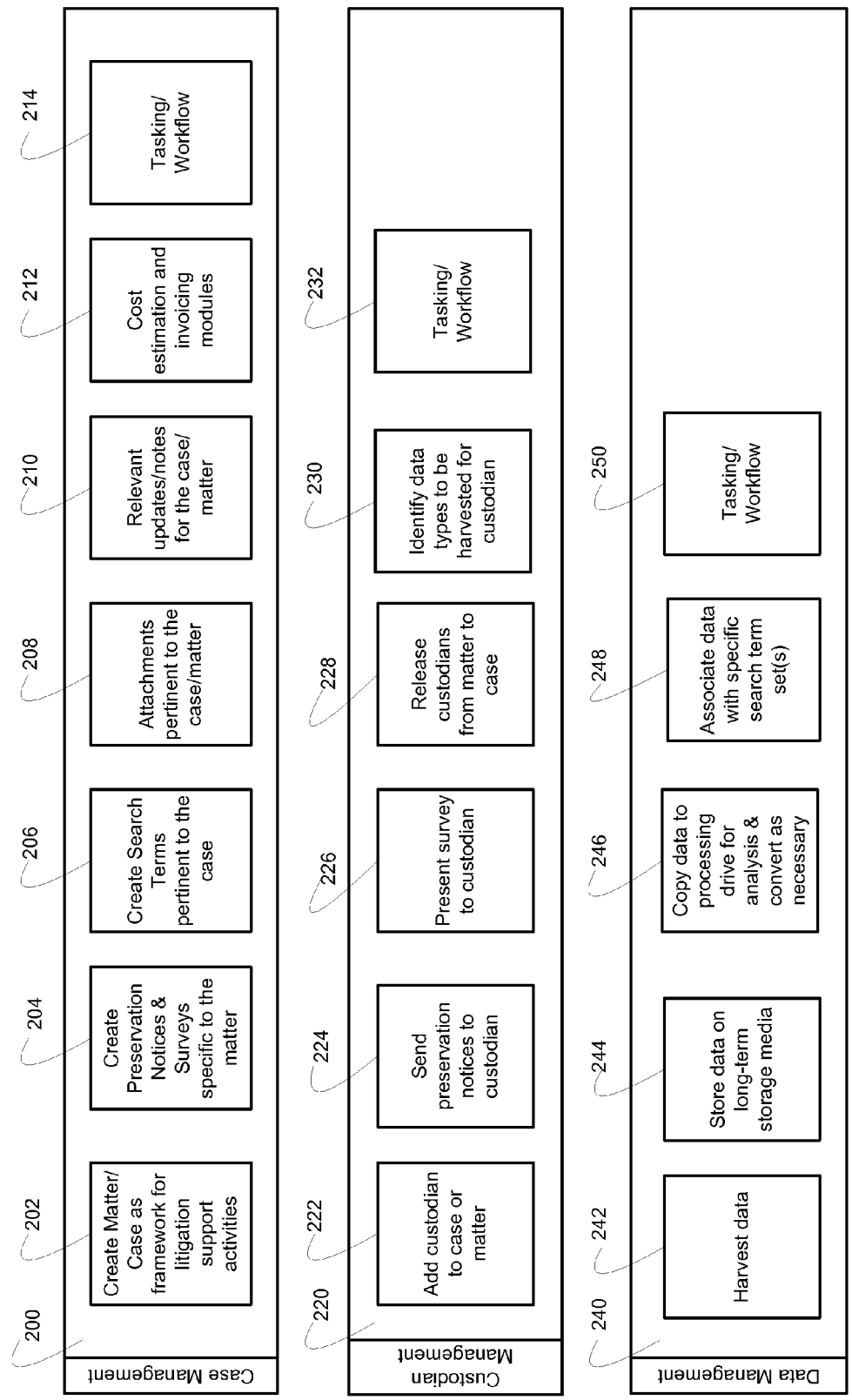
Figure 11:
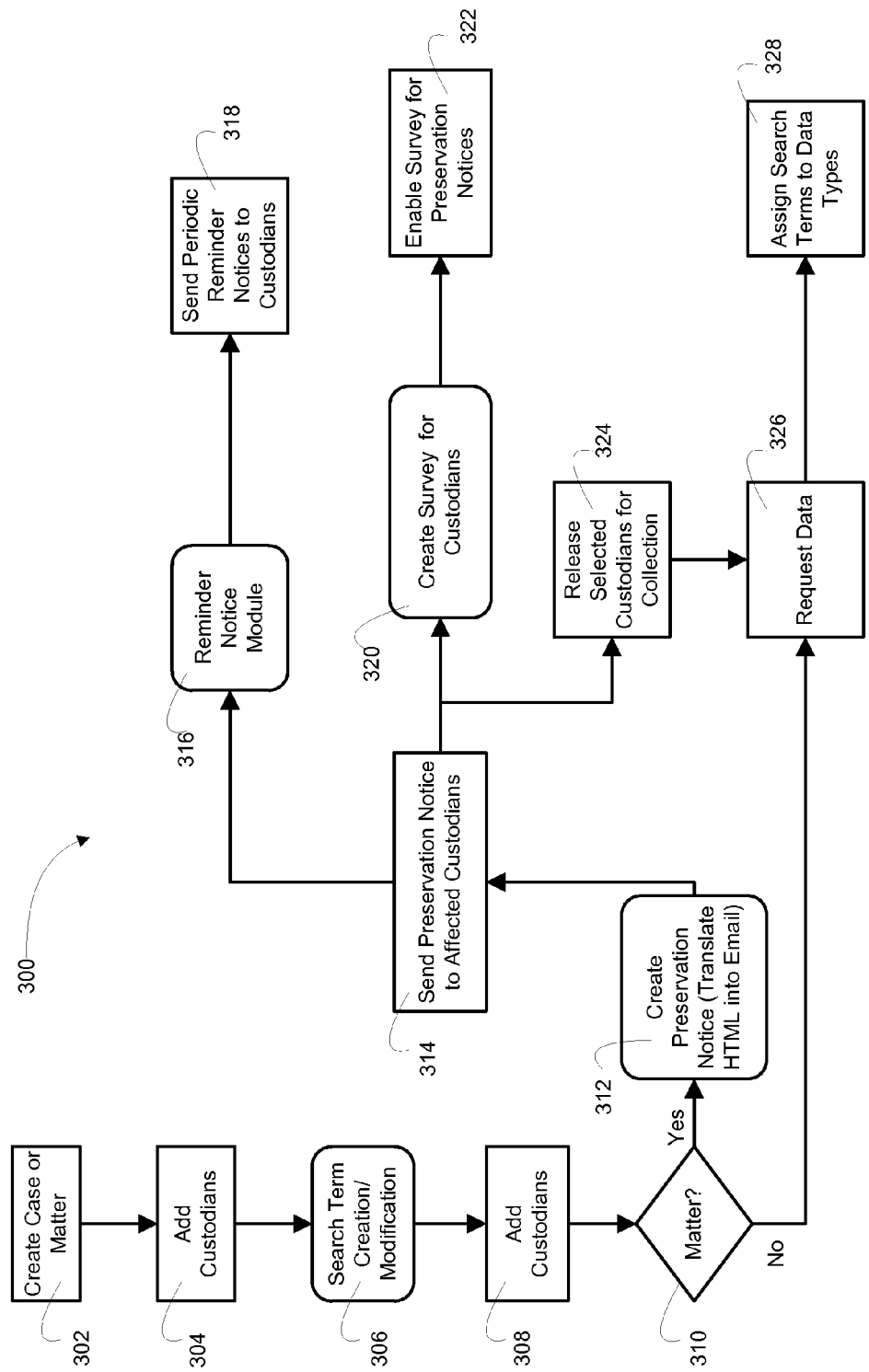
Figure 12:
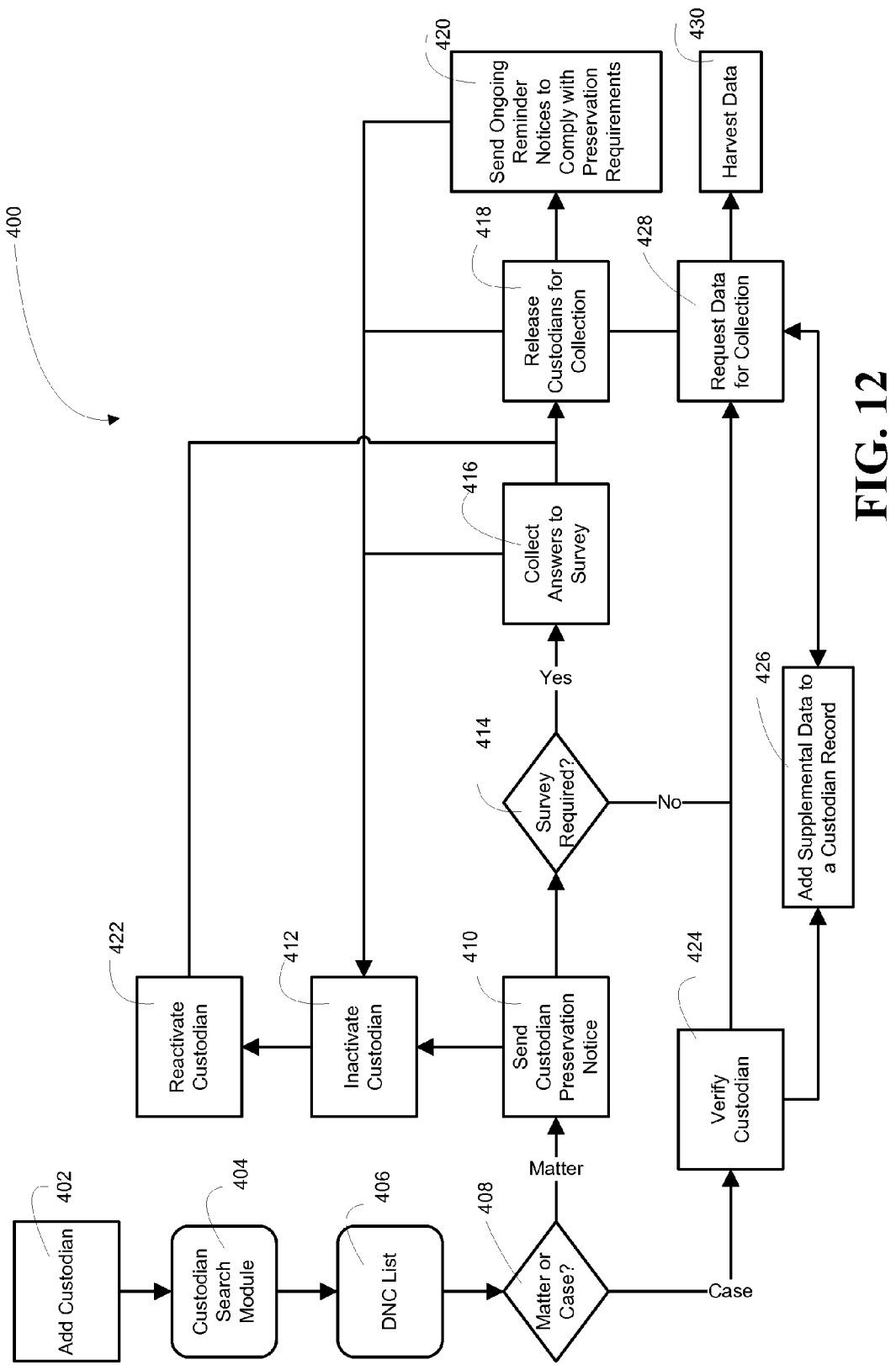
Figure 13:
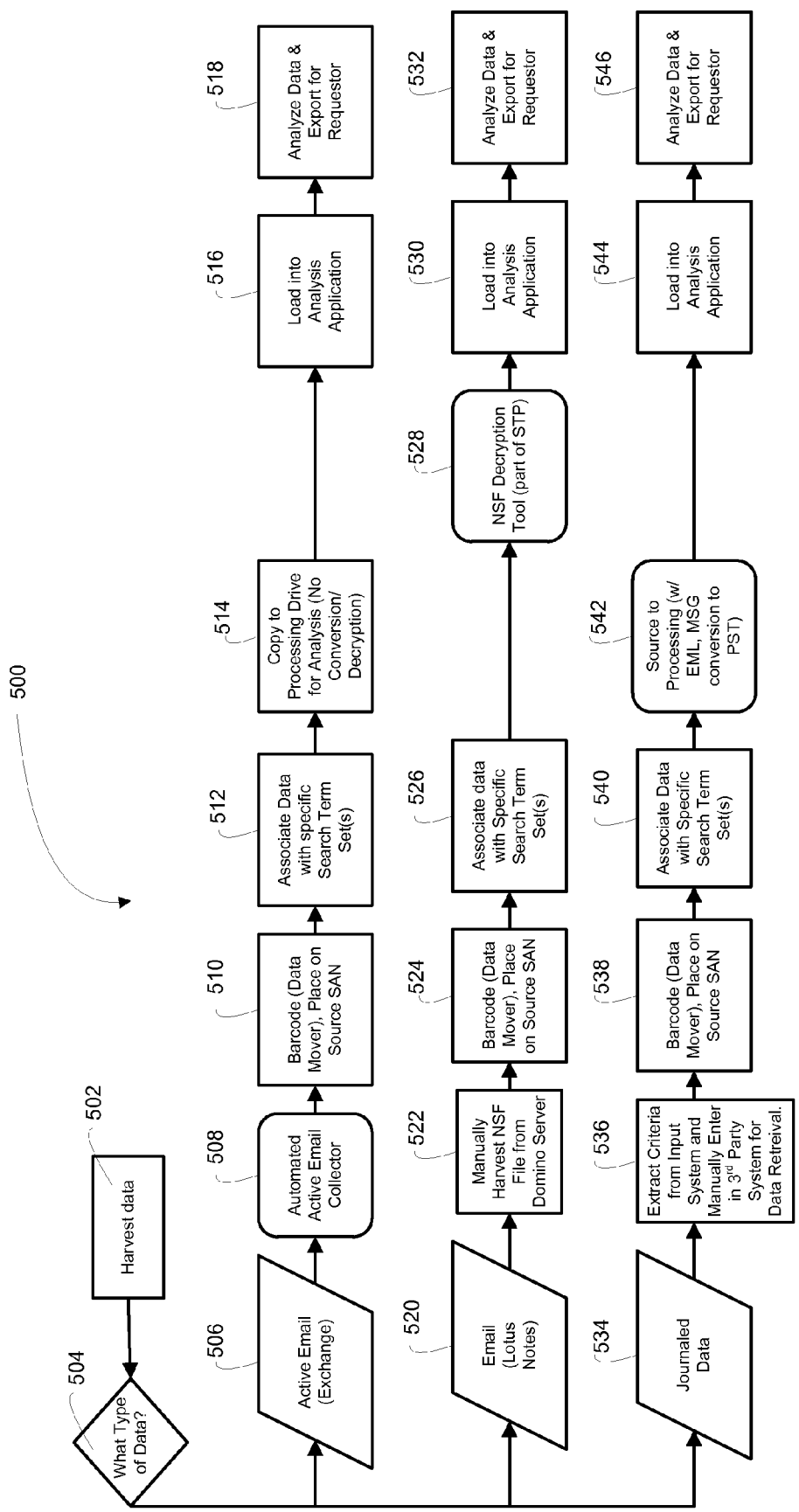
Figure 14:
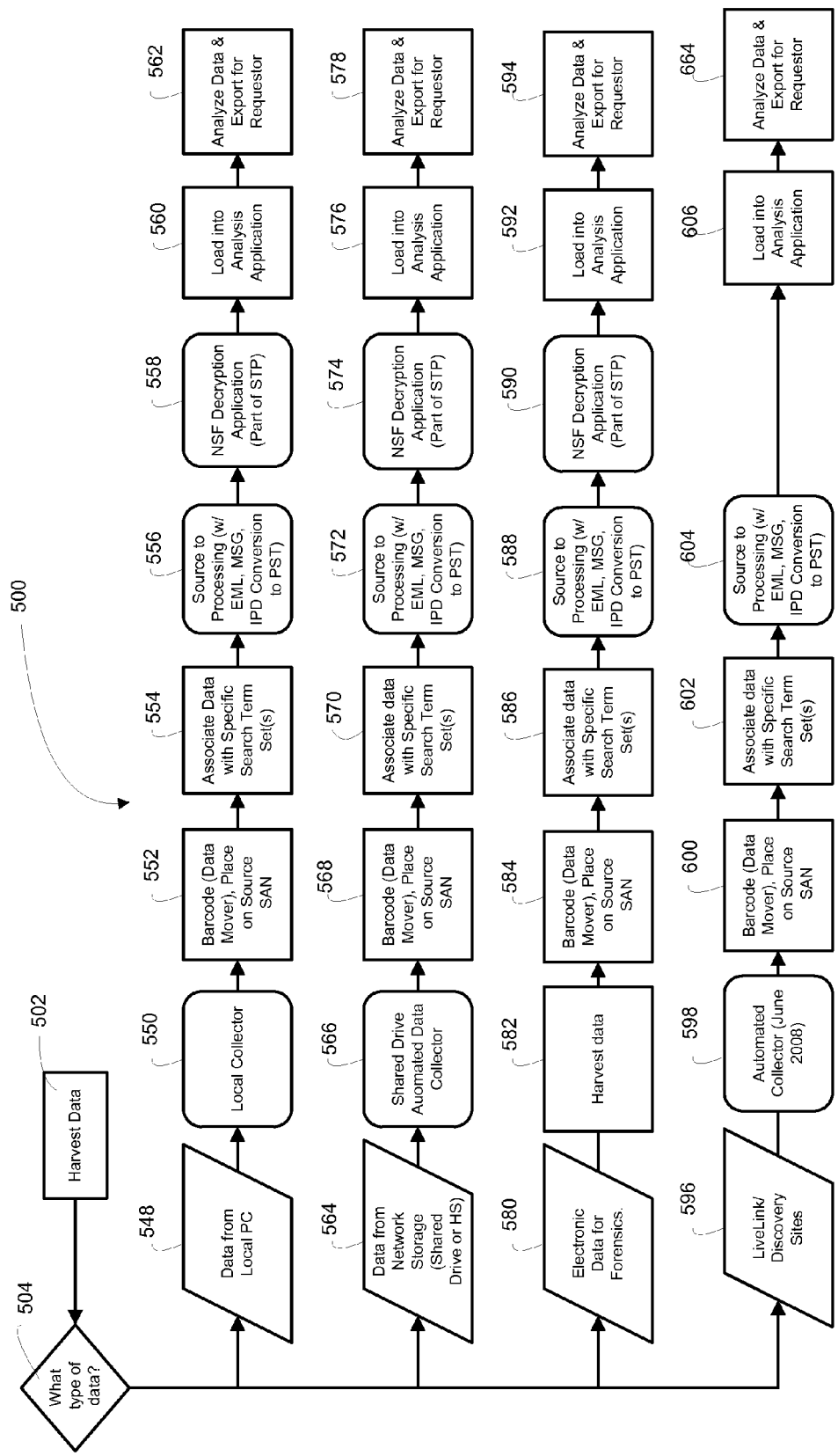

Having thus described embodiments of the invention in general terms, reference will now be made to the accompanying drawings, which are not necessarily drawn to scale, and wherein:

FIG. 1 is a block diagram of an apparatus configured to provide automated data purge in an electronic discovery system, in accordance with embodiments of the present invention;

FIG. 2 is a more detailed block diagram of an apparatus configured to provide automated data purge in an electronic discovery system, in accordance with embodiments of the present invention;

FIG. 3 is a schematic diagram of a system configured to provide an automated data purge in an electronic discovery system, in accordance with embodiments of the present invention;

FIG. 4 is a flow diagram of a method for automated data purge in an electronic discovery system, in accordance with embodiments of the present invention;

FIG. 5 is a flow diagram of an alternate method for automated data purge in an electronic discovery system, in accordance with embodiments of the present invention;

FIG. 6 is a block diagram of an enterprise-wide electronic discovery system highlighting computing device monitoring, in accordance with embodiments of the present invention;

FIG. 7 is a block diagram of an electronic discovery manager server, in accordance with embodiments of the present invention;

FIG. 8 is a block diagram of a database server in an electronic discovery system, in accordance with an embodiment of the present invention;

FIG. 9 is a block diagram of a collection server in an electronic discovery system, in accordance with an embodiment of the present invention;

FIG. 10 is block diagram illustrating electronic discovery management structure, in accordance with an embodiment of the invention;

FIG. 11 is a flow diagram of a method for initiating a case or matter including creating search terms, creating and sending preservation notices, sending reminder notices and creating and sending surveys to custodians, in accordance with embodiments of the present invention;

FIG. 12 is a flow diagram of a method for custodian management in an electronic discovery system, in accordance with an embodiment of the present invention; and FIGS. 13 and 14 are flow diagrams of methods for harvesting different data types in an electronic discovery system, in accordance with an embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, apparatus, systems, methods and computer program products are herein disclosed that provide an automated data purge in an electronic discovery system. The present invention applies business rules (i.e., purge policies) to determine what files within an e-discovery system qualify for purging, locates the that qualifies for purging and, subsequently, automatically purges the data from the file system.

In specific embodiments of the invention purge-eligible cases are automatically determined based on applying business rules (i.e., purge criteria) to the cases existing in the e-discovery system. In such embodiments of the invention, the cases that qualify for purging may be determined by applying the purge criteria to a metadata database associated with the e-discovery system.

In other specific embodiments of the invention the files to be purged are determined and located by querying an e-discovery system metadata database with the identified purge policies to determine the files that qualify for purging, as well as the storage locations within the e-discovery system network that store files that have been determined to qualify for purging. While in other embodiments of the invention files to be purged are determined and located by scanning an e-discovery file directory to identify files that qualify for purging. Scanning may be based on a predetermined naming convention, such as folder names based on a creation date or the like.

In addition, the present invention additionally provides for automatically generating detailed purge tracking/audit data that includes comprehensive purge-related details, such as when the purge occurred, why the purge occurred, the amount of data purged and the like. Moreover, the present invention provides for automatically notifying designated parties of interest (e.g., management, third party entities, data storage personnel) when a purge occurs and the necessary details related to the purge.

FIG. 1 provides a high level schematic diagram of an apparatus 10 configured for providing automated data purge in an electronic discovery system; in accordance with embodiments of the present invention. The apparatus 10 includes a computing platform 12 having at least one processor 14 and a memory 16. It should be noted that apparatus 10 may comprise more than one computing device.

The memory 16 of apparatus 10 stores data purge application 18, which is executable by processor 14 and configured to determine purge-qualifying files 26 within an e-discovery file system based on application of one or more identified purge policies 24. The purge policies 24 are business rules that vary based on the entity implementing the e-discovery system and/or the data purge application. In specific examples the purge policies 24 may include, but are not limited to, (1) purge files from cases that have been resolved/closed for a predetermined period of time, (2) purge data in which the data has been stored at an external (i.e., third party) repository for a predetermined period of time, (3) purge work product data (i.e., data replicated during a post-collection processing stage) from a resolved closed case/matter, or the like.

The data purge application 18 additionally is configured determine the network location 28 of purge-qualifying files 26.

In specific embodiments of the apparatus 10 the data purge application 18 determines the purge-eligible files 26 and/or the network location 28 by accessing an e-discovery system metadata database that includes metadata associated with the files including identification of a storage path that provides for the location of the file in the network. In other embodiments of the apparatus 10 the data purge-application 18 determines the purge-eligible files 26 and/or the network location 28 by scanning an e-discovery file directory based on a predetermined naming convention assigned to folders and/or files in the e-discovery system.

In addition, the data purge application is configured to execute the automated purge 30 of the purge-qualifying files 26 from the e-discovery file system. The purge process may be executed on-demand or based on a predetermined schedule. In addition, the automated purge may be configured so as to limit the amount of data purged during a single purge process (e.g., a maximum number of files, storage units, barcodes or the like) or limit the amount of data purged over a predefined time period (e.g., a maximum amount of files, storage units, barcodes over a month, thirty day period or the like).

Referring to FIG. 2, shown is a more detailed block diagram of apparatus 10, according to embodiments of the present invention. As previously described, the apparatus 10 is configured to provide automated data purge within an e-discovery system. In addition to providing greater detail, FIG. 2 highlights various alternate embodiments of the invention. The apparatus 10 may include one or more of any type of computerized device. The present apparatus and methods can accordingly be performed on any form of computing device, including personal computing devices, laptop/portable computing devices, mobile computing devices or the like.

The apparatus 10 includes computing platform 12 that can receive and execute routines and applications. Computing platform 12 includes memory 16, which may comprise volatile and non-volatile memory, such as read-only and/or random-access memory (RAM and ROM), EPROM, EEPROM, flash cards, or any memory common to computer platforms. Further, memory 16 may include one or more flash memory cells, or may be any secondary or tertiary storage device, such as magnetic media, optical media, tape, or soft or hard disk.

Further, computing platform 12 also includes processor 14, which may be an application-specific integrated circuit ("ASIC"), or other chipset, processor, logic circuit, or other data processing device. Processor 14 or other processor such as ASIC may execute an application programming interface ("API") 40 that interfaces with any resident programs, such as data purge application 18 or the like stored in the memory 16 of the apparatus 10.

Processor 14 includes various processing subsystems 42 embodied in hardware, firmware, software, and combinations thereof, that enable the functionality of apparatus 10 and the operability of the apparatus on a network. For example, processing subsystems 42 allow for initiating and maintaining communications and exchanging data with other networked devices. For the disclosed aspects, processing subsystems 42 of processor 14 may include any subsystem used in conjunction with data purge application 18 or subcomponents or sub-modules thereof.

Computer platform 12 additionally includes communications module 44 embodied in hardware, firmware, software, and combinations thereof, that enables communications among the various components of the apparatus 10, as well as between the other devices in the electronic discovery system. Thus, communication module 44 may include the requisite hardware, firmware, software and/or combinations thereof for establishing a network communication connection and initiating the communication of post-purge notifications.

As previously noted, the memory 16 of computing platform 12 stores data purge application 18, which is executable by processor 14 and configured to automatically purge files from within an electronic discovery file system, in accordance with embodiments of the present invention.

In accordance with specific embodiments of the apparatus 10, the data purge application 18 is configured to determine purge-eligible cases/matters 22 within the e-discovery system based on applying purge criteria 20 to the cases and/or matters existing in the e-discovery system. In specific embodiments, the purge criteria 20 is applied to an e-discovery metadata database to determine which cases and/or matters existing in the e-discovery system are eligible for data purge. Once the purge-eligible cases/matters 22 have been determined, additional purge criteria may be applied to further identify purge-eligible cases for current purge processing. For example, business rules may dictate that one or more cases that are determined to be purge-eligible be excluded from the current purge process (e.g., other pending litigation related to case), in which case, a data purge administrator may configure the data purge application 18 to exclude the one or more identified cases from the pending purge process.

Additionally, the purge policies 24 applicable to the identified purge-eligible cases are identified. As previously noted, the purge policies 24 may include, but are not limited to, (1) purge files from cases that have been resolved/closed for a predetermined period of time, (2) purge data in which the data has been stored at an external (i.e., third party) repository for a predetermined period of time, (3) purge work product data (i.e., data replicated during a post-collection processing stage) from a resolved closed case/matter, or the like. Additionally, the purge policies may dictate that specific folders or file types are included or excluded from pending purge process.

In additional optional embodiments, purge exceptions 25 may be defined. In certain instances, files that would otherwise be purged due to inclusion within identified purge policies may be excluded from purging based on a purge exception 25. Purge exceptions may be chosen from a predefined menu of purge exceptions or defined by an administrator. Purge exceptions 25 may be defined by any data associated with the file (i.e., metadata associated with the file. As such, purge exceptions may be based on, but are not limited to, case, custodian, data type, data source, personal storage device/location, network share storage device/location or the like.

The data purge application 18 is configured determine the network location 28 of purge-qualifying files 26 by applying the one or more identified purge policies 24 to the purge-eligible cases/matters 22. As noted, in specific embodiments, the purge policies 24 are applied to an e-discovery metadata database to determine purge-qualifying files 26 and the network location 28 of such files. For example, if the identified purge policy is the purging of work product, the e-discovery metadata database is able to provide data that identifies the locations in the corporate/entity network where work product is stored (e.g., a network path).

In other embodiments of the invention, replication of source data or the like during the processing of e-discovery data results in the data being stored, at least temporarily, at various network locations (referred to in the art as a "straight burn"). Because of the manipulation and modification of this replicated data, in some instances to a point that it is otherwise unrecognizable, it is not possible to match such data to any other items in the e-discovery database, including matching to a case or the like. As such, it is not feasible to use the metadata database to determine the purge qualification of such data or otherwise locate the data. As such a purge policy 24 that requires purging of data that has been "straight burned" provides for scanning the e-discovery system file directory 27 to determine purge-qualifying files 26. In specific embodiments the scanning is based on the naming convention 29 of folders and/or files in the e-discovery system. For example, folders may be named based on a creation date (e.g. month, date, year) and the purge policy 24 may dictate the purging of all folders older than a predetermined date. In such embodiments of the invention, once the data purge application 18 has identified the purge-qualifying files 26, any defined purge exceptions 25 may be applied, as applicable, to exclude files from current purging.

Once the location of the files has been determined, the data purge application is configured to execute the automated purge 30 of the purge-qualifying files 26 from the e-discovery file system.

Once the automated data purge 30 has been completed, the data purge application may be configured, in specific embodiments, to perform post-purge processing. As such data purge application 18 may configured to, in response to completing the purge process, automatically update the e-discovery metadata database 46 to indicate that for the case/matter 48 and files 50 the data in the files has been purged and is no longer accessible 52, while maintaining all other metadata associated with the file (e.g., maintaining data that identifies where and when the file was collected and the like).

In addition, data purge application 18 may be configured to, in response to completing the purge process, automatically create a purge entry 58 within the file system log 56 of the e-discovery file system 54. The purge entry 58 will include comprehensive details related to the purge process including, but not necessarily limited to, identification of the data purged 60 (e.g., file/folders names), date and time of the purge process 62, the purge policy(s) applied 64 (i.e., why the data was purged), the file system location 66 where the data was deleted from and the like. In this regard the purge entry 58 serves as searchable data that can subsequently be used to determine the specifics surrounding the purge (i.e., the when, where and why down to the file level).

Additionally, the data purge application 18 may be configured to, in response to completing the purge process, automatically generate and initiate communication of a purge notification 68 to predetermined individuals or entities. The purge alert/notification 68 includes details of the completed purge process. Examples of purge details included in the notifications 68 include, but are not limited to, identification of the data purged 70, date/time of the purge process 72, volume of data purged 74 (e.g., number of files, barcodes or storage units), volume of storage recovered/reclaimed 76 and the like. In specific embodiments of the invention, a high-level purge notification is generated and communicated to predetermined individuals/entities (e.g., management, legal or the like) that includes the purge policy applied, the date/time of the purge and the amount of data purged (e.g., number of barcodes, number of files and the like). The amount of storage reclaimed (e.g., number of storage units). The high-level purge notification may also include a hyperlink that allows recipients of the notification to activate to access further details related to the purge process. In other specific embodiments of the invention, a database purge notification is generated and communicated to predetermined database administrators or the like that includes identification of the cases purged, the amount of storage reclaimed (e.g., number of storage units) and the like.

Referring to FIG. 3, a schematic diagram of a system 78 for automated data purge in an electronic discovery system is presented, in accordance with embodiments of the present invention. Data purge apparatus 10 executes data purge application 18 (shown in FIGS. 1 and 2), which may be stored locally or stored remotely and accessed through communication network 102. As previously discussed, data purge application is configured to determine or otherwise receive, via communications network 102, a list of purge-eligible cases/matters by applying purge criteria to electronic discovery file system metadata associated with the cases/matters. Database server 120 (or some other server/device in the e-discovery system) stores case/matter metadata database and is configured to receive a query from the data purge application that requests purge-eligible cases based on the applied purge criteria.

In specific embodiments of the invention, data purge application 18 is configured to locate files within the purge-eligible cases that qualify for purging based on one or more purge policies. As previously discussed, data purge application is configured to locate the qualifying files by applying the purge policies to file system metadata associated with the files/folders being purged. Database server 120 (or some other server/device in the e-discovery system) stores file-level metadata and is configured to receive a query from the data purge application that requests the location of files that qualify for purge.

In other embodiments of the invention, data purge application is configured to locate and determine purge qualification of data that is temporarily stored at a network location (e.g., source data that has replicated or the like). In such embodiments, the data purge application may access an e-discovery system file directory, which may be stored at database server 120 (or some other server/device in the e-discovery system), to perform a directory check/scan to identify purge-qualifying folders and/or files. For example, folders may be identified based on naming convention, such as naming based on date of creation of the folder/file, such that the scan identifies folders/files older than a predetermined date.

Once the data purge application has determined the location of files in the system, the data purge application accesses the storage locations, which may include, but are not limited to, conversion services server 170 and staging drive 180 (which may store work product or the like) as well as storage area network 190, which may comprise multiple different storage units/servers or the like.

Once the purge process has been completed, the data purge application may be configured to create a purge entry in a file system log, which may be stored at database server 120 or elsewhere in the e-discovery system and update the metadata files associated with the files that have purged to reflect that the data has been purged and is no longer accessible.

Turning the reader's attention to FIG. 4, a flow diagram is depicted of a method 80 for providing automated data purge in an electronic discovery system, in accordance with embodiments of the present invention. At Event 82, one or more purge policies are identified for current data purge processing. As previously noted purge policies include but are not limited to, purging data from cases closed after a predetermined period of time, purging data from cases in which data is stored at third party repositories after a predetermined period of time, purging work product after a case has closed (or after a predetermined period of time after the case has closed), purging (or excluding from purging) specific file types, folder types and/or specific files and/or folders. In optional embodiments, one or more purge exceptions are identified that provide for files that would otherwise qualify for purging under the purge policy to be excluded from current purging based on the exception criteria.

At Event 84, the current data purge process is executed by (1) determining one or more files within the e-discovery file system that qualify for purging based on the identified one or more purge policies, (2) locating files within the e-discovery file system and (2) purging the data in the located files from the e-discovery file system. In specific embodiments of the method, files are located by applying the purge policies to file system metadata to determine which files meet the purge policy and the location of the files in the file system. In other embodiments of method, files are determined and located by scanning a file directory based on naming convention to identify files that qualify for purging.

Referring to FIG. 5 a flow diagram is depicted of a method 90 for automated data purge in an electronic discovery system, in accordance with embodiments of the present invention. At Event 91, purge-eligible cases are determined based on applying purge criteria to the cases existing in the electronic discovery system database. In specific embodiments, a listing of purge-eligible cases may be received on a scheduled basis or on an on-demand basis. Purge criteria is based on business rules associated with the e-discovery entity and may include, but are not limited to, cases closed, cases legally approved for purge, cases in which dated has been stored at an external/third party repository and the like.

At optional Event 92, additional criteria may be applied by a purge administrator or the like to identify which purge-eligible cases require current purge processing. In specific instances, based on business rules, cases which are otherwise purge eligible may be excluded current purge processing.

At Event 93, purge policies are identified that are to be applied to the purge-eligible cases for current purge processing. The purge policies implemented will define what data gets purged from the e-discovery file system. As previously noted, the purge policies may include, but are not limited to, purging data from cases closed after a predetermined period of time, purging data from cases in which data has been stored at a third party repository after a predetermined period of time, purging work product data from closed cases and/or the like.

At Event 94, a metadata database is accessed to locate files in the file system that meet the identified purge policies. For example, if the purge policy is purging of work product from one or more cases, the metadata database provides information on all of the locations within the file system where work product files are currently stored. At Event 95, once the location of files is determined, the application accesses the storage locations and purges the data from the storage locations.

At Event 96, in response to purging the data from the file system, a purge entry is entered into the file system log for each file purged. The purge entry is configured to include the file name, the file size, the location of the file, the date/time of the purge, the reason for the purge (i.e., purge policy applied) and, at Event 97, update the metadata database to indicate the occurrence of the purge and that the data is no longer accessible.

At Event 98, purge summary notifications are generated and communicated to parties of interest, such as e-discovery management, legal or the like. The purge summary notifications indicate high level details of the completed purge process including identification of data purged, the date/time of the purge process, the amount of data purged (in terms of files or barcodes), the amount of storage capacity reclaimed and the like. In addition, at Event 99, a storage recovery notification is generated and communicated to parties of interest, such as database administrators or the like. The storage recovery notifications include identification of data purged, the date/time of the purge process, the amount of storage capacity reclaimed and the like.

FIG. 6 illustrates an exemplary electronic discovery system 100 in accordance with an embodiment of the invention. In some embodiments, the environment of the electronic discovery system 100 is the information technology platform of an enterprise, for example a national or multi-national corporation, and includes a multitude of servers, machines, and network storage devices in communication with one another over a communication network. In particular, an electronic discovery management server 110, at least one database server 120, a collections server 130, enterprise personal computers 140, enterprise file servers 150, including at least one personal network storage area and at least one shared network storage area, enterprise email servers 160, a conversion services server 170, a short-term staging drive 180, and a long-term network storage network 190 are all in communication over a communication network 102. The communication network 102 may be a wide area network, including the Internet, a local area network or intranet, a wireless network, or the like.

As shown in the block diagram of FIG. 5, the electronic discovery management server 110 provides user interface management for via user interface 118. In some embodiments, the electronic discovery management server 110 is a web server that can be accessed via a web browser. In one particular embodiment, the electronic discovery management server 110 is an intranet website server that may be accessed utilizing a web browser on a machine within the enterprise. Through the electronic discovery management server 110, the user interface 118 may be presented to a user for the purposes of managing the electronic discovery process and all processes described herein that are inherent thereto. For illustrative purposes, it may be assumed herein that the primary user interacting with the user interface 118 is an employee or contractor of the company who serves an electronic discovery management role, and hereafter is referred to as the "e-discovery manager." As discussed in greater detail below, the e-discovery manager may utilize the user interface 118 to manage cases, custodians, collections, and collected data. It should be appreciated, however, that any individual could use the user interface 118 to perform the manual functions herein attributed to the e-discovery manager, and, indeed, that an automated process could perform those functions as well.

Referring again to FIG. 6, the electronic discovery management server 110 is in communication with the database server 120 and the collections server 130 via the communication network 102. The database server 120, as shown in the block diagram of FIG. 8, is configured to provide database services for the electronic discovery management server 110, including housing the Unified Directory/custodian database 122, which includes data relating to individual custodians, the case database 124, which includes data relating to particular cases, and ongoing collections database 126, which includes data relating to collections being undertaken by the collections server 130. Each of the foregoing databases within the database server 120 is discussed in detail below. It should be understood that multiple database servers could be employed instead of a single database server, and reference to a single database server is for illustrative and convenience purposes only. For example, the Unified Directory 122 could be stored in one database server and the ongoing collections data 126 could be stored in another database server.

Regardless of the number of database servers employed, it is an object of embodiments of the present invention that data relating to custodians and cases be stored in the database server 120 independently. While custodian data in the Unified Directory 122 and case data in the case database 124 may be linked or correlated within the database server 120, for example, when custodians are assigned to particular cases, custodians may be managed separately from cases. Therefore, when a case is initialized and a custodian is assigned to the case, information for that custodian (such as data storage locations for that custodian) is accessed by the electronic discovery management server 110 in the Unified Directory 122 in the database server 120 and linked to the particular case, rather than manually input by the e-discovery manager into the case.

Furthermore, in addition to separating (but allowing linkage of) custodian management and case management processes, and as discussed further below, data management processes relating to the collection of data from custodian storage locations during electronic discovery are also separated from case management and custodian management processes. In this regard, the data collected from a particular custodian is stored separately from both the custodian information and any relevant case information (as discussed below, it is stored in long-term network storage network 190), but is linked to a custodian, which is in turn linked to one or more cases. This is advantageous because in the event a particular custodian is assigned to multiple cases, data collected from the custodian may be shared with the other case(s) to which the custodian is assigned. Therefore, the various processes and components of the electronic discovery system 100 may be categorized within one of case management, custodian management, or data management. And even though cases, custodians, and collected data may all be managed separately, there are necessarily links between the various datastores to allow management of the overall electronic discovery process.

Custodian

With regard to custodian management, according to some embodiments of the present invention, the Unified Directory/custodian database 122 houses information relating to all potential custodians within the enterprise and the locations where those custodians store data. The information stored in the Unified Directory 122 may include for a particular custodian, for example, the custodian's name, position, human resources identifier (a unique number for each employee of the enterprise), employment location, domain, email addresses, network user identification, personal computer(s) name, paths of network storage devices used by the custodian, including Shared Drives and HomeSpaces, work history, related persons (such as managers, team members or subordinates), and any other information that may be relevant to the discovery process. Since the human resources identifier is always unique for each custodian, in some embodiments, the Unified Directory 122 may be organized around the human resources identifier. All of the information relating to how the Unified Directory 122 is generated is a multi-step process that utilizes multiple applications and methods of identifying relevant information.

For example, the electronic discovery management server 110 or the database server 120 may interface with the computer databases of the human resources computer systems of the enterprise to copy the information from the human resources databases into the Unified Directory 122. In some embodiments, the electronic discovery management server 110 may also reach out to a network directory, such as Windows Active Directory, to identify network resources related to particular custodians and integrate this information into the custodian entries including the copied human resources information. Information for the Unified Directory 122 may also be obtained from the managers of the information technology network, i.e., those individuals responsible for setting up email accounts for custodians and managing the various file servers of the enterprise. Furthermore, in addition to retrieving information in the manners described above, in some embodiments, information in the Unified Directory 122 is generated through applications initialized and/or deployed by the electronic discovery management server 110. In particular, in some embodiments, as shown in FIG. 6, a profile scanning application 112, and a mapping application 114 are provided.

The profile scanning application 112 may be deployed by the electronic discovery management server 110 and is configured to crawl the communication network 102, scan each of the enterprise personal computers 140, and transmit to the database server 120 identifying information about each computer, such as computer name and IP address, and a list of all profiles, including demographics information, (or network user identification) associated with each computer. According to different embodiments, the profile scanning application 112 may be run on the electronic discovery management server 110, the collection server 130, or another server in the communication network 102. In some embodiments, the profile scanning application 112 is further configured to identify and transmit to the database server 120 the most recent date and time at which a particular profile was logged on to the machine. When information relating to a particular computer is received by the database server 120, the database server 120 uses the profile information, which may include several user identifications, to link the particular computer to the custodians in the Unified Directory 122 associated with those user identifications. The database server 120 may also record in each custodian's entry in the Unified Directory 122 the last time the computer was accessed by the custodian, according to the profile information transmitted by the profile scanning application 112. Thus, the profile scanning application 112 ultimately generates a list of personal computers used by each custodian, and this list may be presented to the e-discovery manager when a collection of a custodian's local machine(s) is initialized, as discussed in detail below.

In accordance with some embodiments of the invention, the mapping application 114 is configured to crawl the communication network 102 and examine the enterprise file servers 150 residing on the communication network 102 to locate and identify the path of any personal network storage area on each server. As used herein, a personal network storage area is a network storage area associated with a single user who reads data from or writes data to it. Personal network storage areas may be in the form of network storage devices or folders or other resources within a network storage device and may be referred to hereafter for clarity purposes as "HomeSpaces." According to different embodiments, the mapping application 114 may be run on the electronic discovery management server 110, the collection server 130, or another server in the communication network 102. In some embodiments, the mapping application 114 is a Windows service that is scheduled to execute through use of Windows Scheduled Task. As the mapping application 114 crawls the communication network 102, it is configured to examine each file server and transmit to the database server 120 the path of any network storage area within the plurality of servers 134 that it positively identifies as a HomeSpace. In some embodiments, the mapping application 114 is configured to explore the enterprise file servers 150 by obtaining and reviewing the directories on each server and evaluating the paths of each network storage area therein, including folders and other storage devices and resources.

With regard to identifying a particular network storage area as a HomeSpace, according to some embodiments, the mapping application 114 is configured to utilize conventional naming techniques for paths in the communication network 102 to identify those paths of network storage areas within the enterprise file servers 150 that include an indicator, based on the conventional naming techniques, that the particular storage areas associated with those paths are accessed and used by only one user, and are therefore HomeSpaces. In accordance with some embodiments of the invention, each user of the communication network 102 is assigned to at least one user identification and those user identifications are the indicators that the mapping application 114 attempts to locate within paths when identifying HomeSpaces. In such embodiments, it is the convention that the paths of HomeSpaces on the communication network 102 include the user's user identification. On the other hand, paths of shared network storage areas do not include user identifications. Therefore, the mapping application 114 may explore the directories of each server within the plurality of servers, evaluate each path in turn, and make a determination as to whether or not the path includes a user identification.

If it is determined that the path includes the designated indicator, for example, a user identification, the mapping application 114 is configured to positively identify the particular network storage area identified by that path as a HomeSpace and transmit to the database server 120 the particular user identification and the path of the HomeSpace. When that information is received by the database server 120, the database server 120 uses the user identification to link the particular HomeSpace to the custodian in the Unified Directory 122 associated with that user identification. In some embodiments, the mapping application 114 is also configured to recognize and transmit, and the database server 120 is configured to house, an indication of the last time the HomeSpace was accessed by the particular user, for example, the last time any data was read from and/or written to the HomeSpace. Additionally, in some embodiments, the mapping application 114 is configured to recognize when multiple paths map to the same network storage area. The collection server 130 compares paths for the same user to determine if duplicative entries exist. This advantageously enables avoidance of multiple collections of the same data. Thus, the profile scanning application 112 ultimately generates a list of HomeSpaces used by each custodian, and this list may be presented to the e-discovery manager when a collection of a custodian's HomeSpaces is initialized, as discussed in detail below.

In addition to storing a list of personal computers and HomeSpaces used by a particular custodian, which lists were generated by the profile scanning application 112 and the mapping application 114 respectively, in accordance with some embodiments of the present invention, the database server 120 is also configured to store a list of any shared network storage areas used by the custodian. As used herein, a shared network storage area is a network storage area associated with multiple users who read data from and/or write data to it. Shared network storage areas may also be in the form of network storage devices or folders or other resources within network storage devices and may be referred to hereafter for clarity purposes as "Shared Drives." The user interface 118 is configured to receive a path of a Shared Drive input by the e-discovery manager and store the path in the Unified Directory 122 in relation to one or more custodians' human resources identifier(s). More particularly, in some embodiments, once a particular user of the communication network 102 is chosen for the collection process, the e-discovery manager may undertake to identify the particular shared network resources that that individual is using, and eventually, the paths associated with those shared network resources. This may be accomplished through conversations with the particular individual, by utilizing data returned from the local collection application 132 executed on collection server 130 (shown in the block diagram of FIG. 9) deployed to the particular user's machine (as discussed in detail below), and/or by utilizing a file browsing application 116 executed on electronic discovery manager server 110 (as shown in FIG. 7).

According to some embodiments of the present invention, the file browsing application 116 is configured to be utilized by the e-discovery manager through the user interface 118. The file browsing application 116 gives the e-discovery manager elevated authority within the communication network 102 to access, in a limited manner, the enterprise file servers 150 within the communication network 102. While the file browsing application 116 may not allow access to the actual files stored on certain file servers, it allows the e-discovery manager to browse through the directories of the file servers 150, locate files that have been accessed by the custodian, and determine the size of the files. In accordance with some embodiments, the e-discovery manager may initially have a general idea of a particular file server within the enterprise file servers 150 that the custodian has used in the past. For example, the custodian may communicate to the e-discovery manager a particular folder name and/or drive name on which he/she has stored files. Additionally, in some embodiments, the e-discovery manager may have already undertaken a local collection process on the custodian's machine, wherein the local collection application 132 returned a list of the network resources that the user of that machine has used. In that event, the e-discovery manager may be aware of the particular drive referenced by the user. The e-discovery manager may then employ the file browsing application 116 to browse out to the particular drive mentioned, scan the folders for any folder having a name resembling that name given by the user, identify any particular files created by and/or accessed by the user, determine the size of such files, and retrieve the path of any folder (or Shared Drive) including data belonging to the user.

The retrieved paths of the Shared Drives may then be added, either manually or automatically, to the Unified Directory 122 in the database server 120. Thus, the Unified Directory 122 may store in connection with one custodian (and in particular in relation to the custodian's human resources identifier) a list of the personal computers, HomeSpaces, and Shared Drives associated with that custodian. Each of these locations is a potential source of data stored by the custodian, and once an investigation or collection of a custodian is initiated, the location information stored in the Unified Directory 122 may be accessed to determine the particular storage locations that need to be addressed during the investigation/collection. This is advantageous as it allows a completely automated investigation/collection process, rather than relying on the e-discovery manager to manually input the targeted machines and file servers at the time of collection.

It should be noted that the Unified Directory 122 may be regularly or continuously updated as new information is gathered using the applications described herein. More particularly, the electronic discovery management server 110 may be configured to automatically retrieve data from the human resources databases and Active Directory and any other relevant sources, such as information technology directories or lists, as well as deploy the profile scanning application 112 and the mapping application 114, at regularly scheduled intervals. Alternatively, rather than periodically retrieving data from the various data sources such as the human resources databases, the system 100 may be configured such that the database server 120 is continuously interfacing with the data sources such that the Unified Directory 122 is updated in real-time as the data within the data sources update. In either instance, each of the feeds of information into the Unified Directory 122 is regularly updated to ensure that the data in the Unified Directory 122 is current.

In some embodiments, the database server 120 is configured such that all historical data relating to a custodian is stored in relation to that custodian's human resources identifier in the Unified Directory 122. Thus, when the feeds of information into the Unified Directory 122 are updated, in the event data relating to the custodian has updated, the database server 120 is configured to store in the Unified Directory 122 the new data and any relevant metadata, including, for example, the time and date of the update, as well as maintain a record of the old data so that it is still a part of the custodian's profile in the Unified Directory 122. For example, in the event the profile scanning application 114 identifies a new personal computer associated with a custodian and one of the personal computers associated with the custodian previously is no longer identified, the database server 120 is configured to store in the Unified Directory 122 the information for each computer, as well as indications as to when the new computer was first identified and when the old computer was no longer identified. In this way, the custodian profile within the Unified Database 122 may include a history of the personal computers used by the custodian. Such information may be relevant at the time of investigation or collection of the custodian.

One feed of information into the Unified Directory 122 which is particularly relevant to electronic discovery is employment status. According to some embodiments, when the feed of information from the human resources databases to the Unified Directory 122 includes an update as to employment status of a particular custodian, the electronic discovery management server 110 is configured to recognize the update and possibly perform particular functions in response. More specifically, in the event it is recorded in the Unified Directory 122 that the employment status of a particular custodian updates from active to terminated, the electronic discovery management server 110 is configured to determine whether the custodian is assigned to any case or matter, and, if so, to transmit to the designated manager or contact for the case or matter an electronic communication notifying the manager of the terminated status and inquiring as to whether the manager would like the terminated custodian's data collected. In the event the manager responds in the affirmative, the electronic discovery management server 110 is configured to automatically initiate the various collection processes of the present invention. Therefore, the custodian's data may be advantageously collected prior to any destruction or unavailability that could be caused by the termination. Alternatively, in other embodiments, the electronic discovery management server 110 may not communicate with the manager and may automatically initiate collection upon recognizing an update in employment status.

Case

With regard to case management processes, according to some embodiments, a case may be initialized by the e-discovery manager utilizing the user interface 118. In this regard, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager), custodians, etc. The electronic discovery management server 110 is configured to store this information in the case database 124 in the database server 120. The case database 124 is configured to house this information such that all information relating to a particular matter or case is related within the case database 124 and a user can use the user interface 118 to view a profile of the matter or case including all the information.

Once the matter and/or case has been initialized, the e-discovery manager may add custodians to the matter or case. In some embodiments, the electronic discovery management server 110 is configured to add numerous custodians to a single matter or case at one time. In this regard, the e-discovery manager may use the user interface 118 to enter in identifying information about the custodians. The identifying information for each custodian does not have to be of the same type. For example, a name may be entered for one custodian, an email address for another, a network user identification for another, and a human resources identifier for another. The user interface 118 is configured to receive the identifying information in different input areas depending upon the type of identifying information being received. The electronic discovery management server 110 is configured to use the input information to search the Unified Directory 122 in the database server 120 to determine which custodians are associated with the input information. In the case of a human resources identifier being entered, only one custodian in the Unified Directory 122 may be a match. On the other hand, in the case of a name being entered, multiple custodians may be a match.

The electronic discovery management server 110, after searching the Unified Directory 122 with the input identifying information, is configured to present through the user interface 118 a list of all custodians matching the input identifying information. In the event only one match was returned for a particular set of input identifying information, the electronic discovery management server 110 is configured to automatically select the custodian to be added to the case or matter. On the other hand, in the event more than one match was located for a particular set of input identifying information, then the multiple matches may be presented together to the e-discovery manager through the user interface 118 and marked so that the e-discovery manager must review the multiple custodian profiles associated with the matches to determine the correct custodian that should be added to the case or matter. In doing so, the e-discovery manager may consider the other information in the profiles, such as corporate title, work location, associated custodians, etc. Such information can inform the e-discovery manager as to whether the located custodian is the one intended. The e-discovery manager may then select the correct custodian for addition to the case or matter and confirm that all custodians selected may be added to the case or matter. According to some embodiments, "adding" a custodian to a case or matter involves linking correlating the custodian profile in the Unified Directory 122 to the case or matter in the Case database 124.

According to some embodiments, upon adding custodians to a matter, the electronic discovery management server 110 is configured to initiate the transmission of preservation notices and surveys to the custodians. In this regard, preservation notices and surveys relevant to the particular case or matter are stored in or linked to the case profile in the case database 124. Transmission of the preservation notices and surveys to custodians added to the case may be automated, for example, there may be preset instructions within the case profile that cause the electronic discovery management server 110 to transmit a particular preservation notice and survey at a particular date or time or upon a particular initiating event, such as a custodian being added to the case, or the e-discovery manager may manually cause the preservation notices and surveys to be transmitted. In some embodiments, the electronic discovery management server 110 is configured to transmit the preservation notices and surveys via a standard email function. The surveys may be tied to the preservation notices such that they are transmitted to custodians together, and one survey may be tied to more than one preservation notice. When a custodian responds to a survey, the survey response is received by the electronic discovery management server 110 and stored in relation to the relevant custodian in the case profile in the case database 124. Furthermore, the electronic discovery management server 110 may be configured to store all or a portion of the data received in the survey response in the Unified Directory 122 in the custodian's profile.

According to some embodiments, each transmission of a preservation notice and survey to a custodian, and each corresponding response, is tracked in the relevant case profile in the case database 124. The electronic discovery management server 110 may also be configured to transmit reminder notices if responses to the surveys are not received within a predefined period of time. The electronic discovery management server 110 may also be configured to schedule reminder notices to be sent to custodians to periodically refresh the custodians' memory of their duty to preserve files/documents pertaining to the matter. In some embodiments, once a preservation notice has been sent to a custodian, the electronic discovery management server 110 may undertake to prevent any reimaging or refreshing of the custodian's personal computer(s) by transmitting an alert of the preservation notice to the enterprise's information technology management group. In addition, the survey responses received from custodians serve to inform the collection process. For example, one survey may inquire as to what network storage devices the custodian uses when storing data. The answer that the custodian gives to the survey may inform the addition of Shared Drives to the custodian profile in the Unified Database 122 that may be used later in collection.

According to some embodiments of the present invention, the e-discovery manager may utilize the user interface 118 to add attachments, notes, tasks, and search terms to a case or matter. In some embodiments, the contacts/managers for a case may also access the case profile in the case database 124 using a web browser and may add attachments, notes, tasks, and search terms to be stored therein. Thus, the e-discovery manager may not be the only entry with access to the case and case management applications of the electronic discovery management server 110. The subject matter of the attachments, notes and tasks could be anything relevant to the case or matter. In some embodiments, the tasks are tasks that particular custodians must complete and the electronic discovery management server 110 is configured to transmit a notice to the custodians that that the task needs to be completed, perhaps using standard email functions. With regard to attachments, the e-discovery manager, or the contact/manager of the case, may upload relevant files to be attached to the case profile.

With regard to the search terms, the e-discovery manager or the case contacts or managers may add certain terms to the case profile to be applied when searching the collected data to locate data responsive or relevant to the underlying issues in the case. Storing the search terms within the case profile is advantageous as it creates a record of the searching that is to be undertaken with respect to the data and aids in organization of the data, as discussed further below.

According to some embodiments of the present invention, when a decision is made that it is time to collect from certain custodians in a matter, the e-discovery manager may use the user interface 118 to release the custodians from the matter to the underlying case. This release triggers the commencement of collection of the custodians' data. In some embodiments, the electronic discovery management server 110 is configured to allow all custodians assigned to the matter to be released to the case at the same time. In addition, in instances where the e-discovery manager has previously created groups of custodians within the case, the electronic discovery management server 110 is configured to allow a group of custodians to be released from a matter to a case at the same time.

Data

Once a custodian has been identified for collection, whether manually by the e-discovery manager or by being released from a matter to a case, the electronic discovery system 100 is configured to automatically collect the custodian's data using the location information stored in the Unified Directory 122. Therefore, the electronic discovery management server 110 accesses the custodian profile of the custodian to be collected in the Unified Directory 122 and determines, from the information stored therein, the different locations of data storage for the particular custodian that must be collected. There are many different locations that the system 100 can address, including personal computers, email accounts, and network storage areas, including HomeSpaces and Shared Drives.

If a custodian profile (for a custodian released for collection) includes at least one personal computer(s) associated with the custodian, then the electronic discovery management server 110 may undertake to collect the files on these machines. Therefore, the electronic discovery management server 110 may retrieve the relevant machine identifying information, such as domain, name, IP address, etc., and may initialize deployment of a local collection application 132 running on collections server 130 (as shown in FIG. 9).

The local collection application 132 is configured to be deployed from the collections server 130 or another server within the network 102 to any of the enterprise personal computers 140. Therefore, for a particular custodian, the local collection application 132 is configured to utilize the machine identifying information supplied by the electronic discovery management server 110 to be deployed to the identified custodian computer. According to one embodiment, the local collection application 132 is configured to be automatically installed on the target custodian's personal computer. The local collection application 132 is further configured to generate a snapshot of the data residing on the local storage of the personal computer 140, for example, by using a commercially available application such as the Volume Shadow Copy Service, store the snapshot in a storage area on the personal computer, and transmit copies of the files included in the snapshot to the collections server 130. By transmitting the data from the snapshot of the data stored on the hard drive of the personal computer, the local collection application 132 advantageously allows the custodian to continue to use her machine without substantial interference from the local collection application 132 and even interact with the data stored on the hard drive as the snapshot of the data is being transmitted to the collections server 130.

In addition to the functions described above, the local collection application 132 may also be configured to transmit to the database server 120 a catalog of the files included in the snapshot to be stored in the ongoing collections database. This catalog may be referenced by the collections server 130 in order to determine whether collection is complete and to resume interrupted collections at the point of interruption. Additionally, in accordance with some embodiments, the local collection application 132 is configured to compile and transmit to the electronic discovery management server 110 a list of network resources the user is using, including, for example, network applications and file servers that the user has used or accessed. This list of resources may be stored in the database server 120 in the custodian's profile in the Unified Directory 122. With regard to transmission of the files themselves, according to one embodiment of the invention, the local collection application 132 is configured to compress, hash, and upload the files included in the snapshot to the collections server 130.

In some embodiments, the electronic discovery management server 110 may utilize a computer monitoring application 117 to determine when to attempt a collection from a custodian's machine. The computer monitoring application 117 is configured to monitor the network 102 and determine which of the enterprise personal computers 140 are online. Therefore, in the event there is a custodian whose local machine needs to be collected, the computer monitoring application 117 is configured to determine when that machine joins the network 102 (i.e., when it appears to the computer monitoring application 117) and inform the electronic discovery management server 110 that it should initialize the local collection application 132 immediately.

If a custodian profile (for a custodian released for collection) includes any paths for HomeSpaces or Shared Drives, then the electronic discovery management server 110 may undertake to collect the files from these file servers by initializing the file server collection application 134 running on collection server 130 (as shown in FIG. 9). The file server collection application 134 is configured to access the file server located at the given path, whether the file server is a HomeSpace or a Shared Drive, copy the data residing on the file server, and compress, hash, and transmit the copied data to the collections server 130. The file server collection application 134 may be programmed with preset instructions that allow it to only copy files meeting certain criteria, for example, files that have certain file extensions. Alternatively, the programmed instructions may prevent the file server collection application 134 from copying files having certain file extensions or other attributes. Either of the foregoing is advantageous if the e-discovery manager is not interested in copying executable files or source code, for example. In some embodiments, the file server collection application 134 is also configured to generate a size estimate of the files residing on the targeted file server. In one embodiment, the file server collection application 134 may automatically begin the collection process (copying and transmitting data) if the size estimate falls below a predetermined threshold. In addition, in some embodiments, the file server collection application 134 is configured to determine whether a particular folder that it is collecting from a file server includes more than a token amount of nearline files, and, in the event that the folder does include such nearline files, choose to not collect such files so as to avoid overloading the server. Therefore, according to different embodiments, the file server collection application 134 copies all or a portion of the files residing on a file server located at the path given in the released custodian's profile and transmits them to the collections server 130.

If a custodian profile (for a custodian released for collection) includes an email address for an email account on the enterprise email server 160, then the electronic discovery management server 110 may undertake to collect the files from the enterprise email server 160 by initializing the active email collection application 136 running on collections server 130 (as shown in FIG. 9). In some embodiments, the active email collection application 136 is configured to access the particular Microsoft Exchange server within the enterprise email server 160 on which the custodian's account resides (which is known based on the information included in the Unified Directory 122), copy all email located there, including emails deleted by the custodian up to a predetermined period of time prior to the collection, (for example, seven days prior to the collection) and transmit the copied emails to the collections server 130.

Regardless of the storage resource location from which data is being collected, or the particular type of data being collected, the collections server 130 is configured to store the data first (while the collection is still ongoing) in the short-term staging drive 180 until the particular collection is complete, attach a barcode to the set of data resulting from the particular collection, and then copy the data set to the long-term storage area network 190 for permanent storage. Furthermore, the collections server 130 transmits the barcode information to the electronic discovery management server 110 to be stored in the database server 120, for example, in the custodian's profile in the Unified Database 122, in relation to the stored information about the particular collection, whether it was a local collection, an active email collection, a file server collection, etc. Therefore, the barcode can be used for reference at a later date to determine the origin of the data. After the data has been copied to the long-term storage area network 190, the collections server 130 compares the hashing of the data in permanent storage to the original data in the staging drive 180 and, if the hashing is identical, purges the data from the staging drive 180.

Once the data has entered the long-term storage area network 190, it is not necessarily ready for review. Indeed, it is likely that the data may need to be processed before it is searchable and suitable for review by investigators and attorneys. For example, the files may be encrypted in the form in which they are collected and sent to the long-term storage area network 190. Therefore, according to some embodiments, the data may be copied to the conversion services server 170 where a series of decryption and standardization functions may be applied to it. After the data is decrypted and standardized, it is returned to the long-term storage area network 190 and may remain there to be accessed for review purposes.

With reference now to FIG. 10, a block diagram is provided that illustrates the electronic discovery management structure of the present invention, according to some embodiments. As illustrated in FIG. 10, certain processes described herein may be categorized within one of case management, as represented by Block 200, custodian management, as represented by Block 220, or data management, as represented by Block 240. As described above, the electronic discovery system 100 is arranged such that cases, custodians and data may be managed independent of one another. However, there is still an element of the categorization of processes within the categories that is conceptual, and it should be understood that certain processes may be correctly assigned to more than one category. Therefore, while the architecture of the system 100 allows separate management of custodians, cases, and data, certain processes of the present invention may affect more than one of the foregoing.

The first process that falls within the case management category is creation of a matter or case as a framework for litigation support activities, as shown in Block 202. As described above, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager) etc.

It is noted that custodian information is stored separately from the case information allowing for the same custodian in multiple cases. This provides for the electronic discovery system of the present invention to have scalability, whereby evidence associated with one custodian may be used in multiple cases.

The electronic discovery management server 110 stores this information in the case database 124 in the database server 120. The case database 124 houses this information such that all information relating to a particular matter or case is related within the case database 124 and a user, such as a manager or contact, can use the user interface 118 to view and edit a profile of the matter or case.

The next process within case management is the creation of preservation notices and surveys specific to the matter, as shown in Block 204. In this regard, the e-discovery manager may, through the user interface 118, either generate a new preservation notices or surveys relevant to the particular case or matter to be stored in the case profile in the case database 124 or, alternatively, link a preservation notice or survey already stored in the database server 120 to the case profile of the specific case or matter at issue. Also within case management is the creation of search terms pertinent to the case, as represented by Block 206. As described above, the e-discovery manager or a contact or manager for the case may use the user interface 118 to input individual search terms or search term sets to be applied to the data harvested in the case. In some embodiments, the search terms may be limited to be used with particular custodians and/or with particular harvested data types. The search terms will be saved in the case database 124 so that they may be readily applied to harvested data and used in connection with storing the resulting responsive data.

The processes of entering relevant attachments, notes and updates to a particular case or matter also falls within the case management category, as demonstrated by Blocks 208 and 210. The e-discovery manager or a case contact or manager may use the user interface 118 to upload documents and enter notes and other relevant data, including updates and reminders, to be stored in the case profile of the case in the case database 124. Once these attachments, notes and updates are added, they may be referenced whenever a user views the case profile through the user interface 118. The cost estimation modules of the present invention are also processes that are categorized as case management processes, as shown in Block 212. In this regard, the electronic discovery management server 110 utilizes a cost estimation application to determine the cost of harvesting and reviewing data, based on a number of factors including, for example, number of custodians, amount of harvested data, data types, etc. Finally, case management also includes a number of tasking and workflow processes that are represented by block 214.

Moving now to custodian management, certain processes falling within the category of custodian management are shown in Block 220. While the processes involving generation of the Unified Directory 122 certainly could be categorized as custodian management, the processes shown in FIG. 10 include those processes involving management of custodians within the scope of a case or matter. In that regard, the first process of custodian management included in FIG. 10 is the addition of custodians to a case or matter, as shown in Block 222. As described above, the e-discovery manager may use the user interface 118 to link a custodian's profile from the Unified Directory 122 to the particular case profile in the case database 124. Thus, the custodian profile and case profile are correlated. The next processes within custodian management is the transmission of preservation notices and surveys to custodians, as shown in Block 224, and the presentation of the surveys to custodians, as shown in Block 226. The electronic discovery management server 110 uses the contact information in the custodian's profile in the Unified Directory 122 to transmit the preservation notice(s) and survey(s) stored in the case profile to the custodian. In some embodiments, a standard email function is used, so that the only information needed from the Unified Directory 122 is the custodian's email address. When the custodian checks her email, the survey will appear as a message therein, and when she opens that message, the survey will be presented to her. The survey may be configured such that when she fills it out, the survey is automatically transmitted back to the database server 120 for storage in the case profile and the custodian's profile.

Also falling within custodian management is the process of releasing custodians from a matter to a case, as shown in Block 228. The e-discovery manager uses the user interface 118 to mark the custodian's profile so that the custodian is now activated for collection of data. This may occur within the case database 124 since the custodian's profile is linked thereto. Once the custodian is released/marked, the electronic discovery management server 110 may access the custodian's profile and initialize collection based on the various data storage locations identified in the profile. Therefore, as represented by Block 230, the electronic discovery management server 110 may automatically determine the data types and locations of data to be harvested by accessing the custodian's profile in the Unified Directory 122. Alternatively, the e-discovery manager may manually make the same determination by accessing and viewing the custodian's profile. Finally, as with case management, custodian management also includes a number of tasking and workflow processes that are represented by Block 232.

The last category is data management, represented by Block 240. One major set of processes within data management are the processes relating to the harvesting of data, as shown in Block 242. These processes include the collection of data from all the different storage areas of a particular custodian, including the custodian's local storage on her personal computer(s), the custodian's network storage areas, the custodian's email, and any other areas, as are described herein. All of the data in the various storage areas is copied and transmitted to the collections server 130, as described in detail for each particular collection application or process. Upon reaching the collections server 130, data resulting from a particular collection is temporarily stored in the short-term staging drive 180 until the collection is complete, at which point it is stored in the long-term storage area network 190 in association with a specific identifying barcode. The foregoing process is represented by Block 244. The data may require decryption or standardization functions to be applied to it in order for it to be searchable and/or otherwise usable, so the next process that falls within data management is the copying of the data to the conversion services server 170 for analysis and conversion as necessary, as shown in Block 246. Once the data is converted, it is returned to the long-term storage area network 190 to be used in review.

Also falling within data management is the association of particular data sets with particular sets of search terms stored in the case profile of the case database 124. In this regard, certain search terms stored in the case profile are stored with the intention of being applied to certain types of data and/or certain custodian's data. Alternatively, certain search terms may be applied to all data collected for a specific case. In either instance, the electronic discovery management server 110 accesses the case profile, determines the search terms to be applied, and associates the search terms with the barcode of the appropriate data sets in long-term storage. Thus, the search terms will be applied to that data and the results will be generated and presented to reviewers for analysis. Finally, as with the other management categories, data management also includes a number of tasking and workflow processes that are represented by Block 250.

With reference to FIG. 11, an exemplary process for managing a case is provided, in accordance with one embodiment of the present invention. As represented by Block 302, a case or matter is created by the e-discovery manager and stored in the case database 124. Next, custodians are added to the case, as shown in Block 304, by linking the custodian profiles of the Unified Directory 122 to the case profile. Next, as represented by Block 306, the e-discovery manager and/or the case contact or manager adds search terms to be applied to data harvested for the case, including instructions as to applying the search terms to particular data types or custodians. Block 310 represents the determination that must be made as to whether there is a matter or just a case. If there is no matter because preservation notices are not required, for example, for an audit, then the process will move straight to the initialization of data collection. On the other hand, if there is matter, rather than just a case, then the creation of preservation notices is required, as shown in Block 312.

The preservation notice, as shown in Block 314 is transmitted to the custodians added to the matter, perhaps using email. As shown in Block 316, a reminder notice module may be employed. As shown in Block 318, the reminder notice module transmits periodic reminder notices to custodians. The notices may be sent over email and may remind custodians about the preservation notice and/or remind custodians to fill out surveys. With regard to surveys, in the event a survey is required or desired, according to Block 320, a survey is created. The survey may be saved in the case profile in the case database 124. As shown in Block 322, it is possible to enable the survey to be attached to and transmitted with the preservation notices.

Next, as shown in Block 324, the e-discovery manager may release custodians from the matter to the case, which initialized collection of the custodian's data. As shown in Block 326, the e-discovery manager or the electronic discovery management server 122 accesses the custodian profile, determines the data types and location to be collected, and initializes the applicable collection applications to go collect the data. Once the data has been collected and a unique barcode has been assigned to each dataset based on the particular custodian and storage location from which it originated, as shown in Block 328, the search terms previously stored in the case profile may be assigned to the dataset based on the input instructions regarding the search terms. These search terms may be applied to the dataset and the results saved to be presented to reviewers for analysis.

With reference to FIG. 12, an exemplary process for managing a custodian is provided, in accordance with one embodiment of the present invention. First, as represented by Block 402, a custodian is added to a matter or case. In this regard, the custodian's profile in the Unified Directory 122 is linked to the relevant case or matter profile. In order to locate the custodian's profile, a custodian search module may be employed, as shown in Block 404. Therefore, the e-discovery manager may enter any identifying information about the custodian, whether it is the custodian's name, network user identification, email address, etc. The custodian search module will take the input information and search the Unified Directory 122 for a match. If more than one match is obtained, the user interface 118 will present all matches and allow the e-discovery manager to browse the associated profiles to determine the intended custodian. In this way, the correct custodian is identified and the profile of that custodian is linked to the appropriate case or matter.

As represented by Block 406, the electronic discovery management server 110 may determine whether the particular custodian added is a member of the enterprise "do-not-call list." In this regard, there may be an indication in the custodian's profile in the Unified Directory 122 that the particular custodian should not be contacted regarding collections, and an alternative contact should be used, such as an administrative assistant of the custodian. Alternatively, there may be a separate do-not-call list stored in the database server 120 that must be accessed and searched to determine whether or not the custodian appears on that list. In either instance, a determination is made as to whether or not the custodian should be directly contacted, and in the event the custodian should not be directly contacted, the contact information for the custodian's assistant (or other stand-in) should be obtained. This information will be used later for transmitting preservation notices and surveys.

Next, in accordance with Block 408, a determination is made by the electronic discovery management server 110 as to whether the custodian has been added to a matter or a case. If it is a case, then the custodian is verified, as shown in Block 424, supplemental data may be added to the custodian profile in the Unified Directory 122 as required, as shown in Block 426, and then the various collection applications are initialized by the electronic discovery management server 110 for collection of the custodian's data, as shown in Block 428. On the other hand, if it is a matter, then preservation notices are required. Therefore, as shown in Block 410, a preservation notice is sent via email to the custodian or custodian stand-in. As shown in Block 412, the custodian may then be inactivated from the case because, for some reason, data does not need to be collected from the custodian. In the future, when it comes time to collect from the custodian, the custodian will be reactivated, as shown in Block 422.

After a preservation notice is sent, a determination is made by the electronic discovery management server 110 as to whether a survey is required, as shown in Block 414. It should be noted that in alternate embodiments the decision on whether to send a survey may be made prior to sending the preservation notice. In such alternate embodiments, if the survey is required, it may become a component of the preservation notice and, thus, accessed simultaneously by the custodian. If a survey is required, it is transmitted in conjunction with a preservation notice, and the answers are collected by the electronic discovery management server 110 and stored in the database server 120, as shown in Block 416. Reminder notices for the preservation notices and surveys may also be transmitted to the custodian, as shown in Block 420. Next, once it is time to collect data, the custodian is released from the matter to the case, as shown in Block 418, and the various collection applications are initialized by the electronic discovery management server 110 for collection of the custodian's data, as shown in Block 428. In this process, the custodian's profile in the Unified Directory 122 is accessed in order to determine the various locations where the custodian may have stored data. Finally, as shown in Block 430, the custodian's data is collected.

Referring to FIGS. 11 and 12, flow diagrams are presented of a method 500 for harvest data from various data sources, in accordance with embodiments of the present invention. At Event 502, the collection of data ensues and, at Event 504, the type of data is identified. Data Block 506 signifies active email that is collected from an exchange system or the like. At Event 508 the automated active email collection application is implemented to collect email from identified email address. As previously noted, and in accordance with present embodiments of the invention, if a custodian profile (for a custodian released for collection) includes an email address for an email account on the enterprise email server (160), then the electronic discovery management server (110) may undertake to collect the files from the enterprise email server (160) by initializing the active email collection application (136) running on collections server (130). In some embodiments, the active email collection application (136) is configured to access the particular Microsoft Exchange server within the enterprise email server 160 on which the custodian's account resides (which is known based on the information included in the Unified Directory 122), copy all email located there, including emails deleted up to a designated prior period, for example, seven days prior to the collection, and transmit the copied emails to the collections server (130). The email collection application is also capable of implementing bulk requests and for collecting email on a scheduled basis, such as daily. The email collection application is additionally capable of being implementing enterprise-wide and requires no server identifiers or the like to collect the active email. In this regard, the email collection application (136) serves to reduce security risk.

At Event 510, a barcoding application is implemented at a staging location, such as short-term staging drive (180) to attach a barcode to the set of email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180). As such, barcoding is performed without the need to execute the barcoding application on an exchange server and, as such no human intervention is needed in the barcode process. In accordance with embodiments of the present invention, one barcode may be assigned per custodian, per data type and per event (i.e., case, matter, etc.)

At Event 512, the collected email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 514, the collected and barcoded active email data is copied to a processing drive for subsequent analysis. It should be noted that the nature of email data obviates the need to perform conversion and/or decryption on the data set. At Event 516, the active email data set is loaded into the analysis application and, at Event 518, the data set is exported to the requestor/reviewer for analysis.

Data Block 520 signifies other non-exchange server based email, such as email accessed through a client-server, collaborative application. At Event 522, NSF files or any other file types associated with non-exchange server based email is manually harvested from an enterprise-grade email server having collaborative capabilities, such as a Lotus Domino server or the like.

At Event 522, a barcoding application is implemented at a staging location, such as short-term staging drive (180) to attach a barcode to the set of non-exchange server email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180).

At Event 526, the collected non-exchange server email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 528, the NSF files or any other file types associated with non-exchange server based email that may be encrypted is decrypted using a decryption application, in accordance with embodiments of the present invention. The encryption of NSF files occurs at the user level and, therefore only the user has the password necessary for decryption. The decryption application allows for decryption of the NSF filetype data without the knowledge of the user/encrypter. The decryption application finds ID files that exist anywhere in the enterprise system, creates a database of the ID files, associates the database with the user/encrypter and subsequently decrypts the data.

At Event 530, the non-exchange server email data set is loaded into the analysis application and, at Event 532, the data set is exported to the requestor/reviewer for analysis.

Data Block 534 signifies journaled data, such as electronic commerce data stored on a repository for the purpose of regulation, compliance to regulating bodies, such as the Securities and Exchange Commission (SEC) or the like. At Event 536, criteria is extracted from input system and manually entered in a designated third party system for data retrieval.

At Event 538, the barcoding application is implemented at a staging location, such as short-term staging drive (180) to attach a barcode to the set of journaled data resulting from the particular collection. The barcoded data is then copied and communicated to the long-term storage area network (190) for permanent storage. At Event 540, the collected and barcoded journaled data may be associated with a specific search term set or sets.

At Event 542 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files and the like.

At Event 544, the journaled data set is loaded into the analysis application and, at Event 546, the journaled data set is exported to the requestor/reviewer for analysis.

Referring to FIG. 14, data block 548 signifies data from a local Personal Computer (PC), such as enterprise PC (140). At Event 550, the local collection application (132) is implemented to collect data from designated PCs by taking a "snapshot" of the device's hard drive. According to one embodiment of the invention, the local collection application may be autodeployed thus, obviating the need for any manual entry by the e-discovery manager or the like. In other embodiments of the invention, the local collection application (132) may be employed to collect data from network storage.

At Event 552, the barcoding application is implemented at a staging location, such as short-term staging drive (180) to attach a barcode to the set of local PC data resulting from the particular collection. The barcoded data is then copied and communicated to the long-term storage area network (190) for permanent storage. At Event 554, the collected and barcoded local PC data may be associated with a specific search term set or sets.

At Event 556 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files, IPD formatted files and the like.

At Event 558, the local PC files that may be encrypted are decrypted using a decryption application, in accordance with embodiments of the present invention. The decryption application allows for decryption of the PC files data without the knowledge of the user/encrypter. The decryption application finds ID files that exist anywhere in the enterprise system, creates a database of the ID files, associates the database with the user/encrypter and subsequently decrypts the data.

At Event 560, the local PC data set is loaded into the analysis application and, at Event 562, the local PC data set is exported to the requestor/reviewer for analysis.

Data block 564 signifies data from network storage, such as a shared drive or HomeSpace. At Event 566, the file server collection application (134) is implemented to automatically collect data from shared drives and/or HomeSpace. According to one embodiment of the invention, the file server collection application (134) may be autodeployed thus, obviating the need for any manual entry by the e-discovery manager or the like.

At Event 568, the barcoding application is implemented at a staging location, such as short-term staging drive (180) to attach a barcode to the set of network storage data resulting from the particular collection. The barcoded data is then copied and communicated to the long-term storage area network (190) for permanent storage. At Event 570, the collected and barcoded network storage data may be associated with a specific search term set or sets.

At Event 572 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files, IPD formatted files and the like.

At Event 574, the network storage files that may be encrypted are decrypted using a decryption application, in accordance with embodiments of the present invention. The decryption application allows for decryption of the network storage data without the knowledge of the user/encrypter. The decryption application finds ID files that exist anywhere in the enterprise system, creates a database of the ID files, associates the database with the user/encrypter and subsequently decrypts the data.

At Event 576, the network storage data set is loaded into the analysis application and, at Event 578, the network storage data set is exported to the requestor/reviewer for analysis.

Data block 580 signifies electronic data for forensics. At Event 582, a forensic collector application may be executed on the devices of interest to collect data. According to one embodiment of the invention, the forensic collector application may be automatically deployed on the device of interest without the knowledge of the device user. In accordance with another embodiment of the invention, a computer monitoring application may be implemented (not shown in FIG. 11 or 12) that monitors the network to determine the addition or subtraction of computers to the network based on network status indicators, such as ID's/IP addresses returned from the network.

At Event 584, the barcoding application is implemented at a staging location, such as short-term staging drive (180) to attach a barcode to the set of forensic data resulting from the particular collection. The barcoded data is then copied and communicated to the long-term storage area network (190) for permanent storage. At Event 586, the collected and barcoded forensic data may be associated with a specific search term set or sets.

At Event 588 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing may be required on EML formatted files, MSG formatted files, IPD formatted files and the like.

At Event 590, the forensic files that may be encrypted are decrypted using a decryption application, in accordance with embodiments of the present invention. The decryption application allows for decryption of the network storage data without the knowledge of the user/encrypter. The decryption application finds ID files that exist anywhere in the enterprise system, creates a database of the ID files, associates the database with the user/encrypter and subsequently decrypts the data.

At Event 592, the forensic data set is loaded into the analysis application and, at Event 594, the network storage data set is exported to the requestor/reviewer for analysis.

Data block 596 signifies collaborative data, such as data residing at discovery sites. At Event 598, a discovery site collector application may be executed on the devices of interest to collect data. According to one embodiment of the invention, the discovery site collector preserves at least a portion of the discovery site database in the e-discovery database, including all files and all revisions of the files. In this regard, the discovery site collector application queries against the database to define what files need to be retrieved, then copies those files based on the result of the query. Metadata pertaining to the files is retained in the case management system tables. In accordance with another embodiment of the invention, the discovery site collector application collects the documents and the related metadata and uses the metadata to automatically rename the files.

At Event 600, the barcoding application is implemented at a staging location, such as short-term staging drive (180) to attach a barcode to the set of discovery site data resulting from the particular collection. The barcoded data is then copied and communicated to the long-term storage area network (190) for permanent storage. At Event 602, the collected and barcoded discovery site data may be associated with a specific search term set or sets.

At Event 604 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing may be required on EML formatted files, MSG formatted files, IPD formatted files and the like.

At Event 606, the discovery site data set is loaded into the analysis application and, at Event 608, the discovery site data set is exported to the requestor/reviewer for analysis.

Thus, present embodiments herein disclosed provide for improvements in electronic discovery. Embodiments herein disclosed provide for an enterprise-wide e-discovery system that provides for data to be identified, located, retrieved, preserved, searched, reviewed and produced in an efficient and cost-effective manner across the entire enterprise system. In addition, by structuring management of e-discovery based on case/matter, custodian and data and providing for linkage between the same, further efficiencies are realized in terms of identifying, locating and retrieving data and leveraging results of previous e-discoveries with current requests.

Specifically, embodiments of the invention previously disclosed provide predictive and automated coding of identical or highly similar documents for the purpose of limiting the volume of documents requiring review and thereby increasing the overall efficiency of the document review process. Additional embodiments provide for targeted document review assignments that determine concept-related data groupings within the overall corpus of data associated with a case and generate the targeted document review assignments based on the concept-related data groupings. As such, document reviewers are presented with assignments that have highly conceptually-related documents, which results in further efficiency in the review process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed:

1. An apparatus for automated data purge in an electronic discovery (e-discovery) system, the apparatus comprising:
   a computing platform including a memory and at least one processor in communication with the memory;
   a data purge application stored in the memory, executable by the processor and configured to:
      determine one or more purge-eligible e-discovery cases by querying an e-discovery system metadata database with predetermined purge criteria to determine one or more purge-eligible cases,
      determine (1) files within an e-discovery file system that are associated with the purge-eligible cases and qualify for purging based on identified purge policies, wherein the purge policies include at least (i) purging e-discovery work product data based on an associated case being closed, (ii) purging all data associated with a closed case after a predetermined period of time, and (iii) purging data stored at an external repository after a predetermined period of time commencing from a date, and (2) storage locations within the e-discovery file system associated with the files by querying an e-discovery system metadata database with the purge policies,
      determine replicated source data files within the e-discovery file system that are associated with the purge-eligible cases and qualify for purging by scanning an e-discovery system file directory to identify the replicated source data files that qualify for purging based on the one or more identified purge policies,
      purge data from (1) the storage locations within the e-discovery file system associated with the files, and (2) the replicated source data files, and
      in response to purging the data, automatically (1) update the e-discovery file system to reflect that the data has been purged by creating a purge entry in a file system log that includes details of the data purge, and (2) update metadata that is stored in an e-discovery system metadata database and associated with the purged files, to indicate that the data has been purged and is no longer accessible.

2. The apparatus of claim 1, wherein the data purge application is further configured to determine replicated source data files within the e-discovery file that are associated with the purge-eligible cases and qualify for purging by scanning the e-discovery system directory by folder name to identify folders having a predetermined naming convention.

3. The apparatus of claim 1, wherein the data purge application is further configured to determine the files that qualify for purging based on the identified purge policies and one or more exceptions to the purge policies.

4. The apparatus of claim 1, wherein the data purge application is further configured to create the purge entry, wherein the purge entry includes identification of the data purged, date and time of data purge, identification of purge policy applied, and file system location of data purged.

5. The apparatus of claim 1, wherein the data purge application is further configured to, in response to purging the data, generate and initiate communication of a purge alert that notifies recipients of one or more of an identity of the data purged, a time at which the data was purged, an amount of data purged, an amount of storage capacity reclaimed.

6. A method for automated data purge in an electronic discovery (e-discovery) system, the method comprising:
   identifying purge policies to apply to current data purge processing, wherein the purge policies include at least (i) purging e-discovery work product data based on an associated case being closed, (ii) purging all data associated with a closed case after a predetermined period of time, and (iii) purging data stored at an external repository after a predetermined period of time;
   executing, by a computing device processor, the current data purge processing including:
      determining one or more purge-eligible e-discovery cases by querying an e-discovery system metadata database with predetermined purge criteria to determine one or more purge-eligible cases,
      determining (1) files within an e-discovery file system that are associated with the purge-eligible cases and qualify for purging based on the identified purge policies, and (2) storage locations within the e-discovery file system associated with the files by querying an e-discovery system metadata database with the purge policies,
      determining replicated source data files within the e-discovery file system that are associated with the purge-eligible cases and qualify for purging by scanning an e-discovery system file directory to identify the replicated source data files that qualify for purging based on the one or more identified purge policies, and purging data from (1) the storage locations within the e-discovery file system associated with the files, and (2) the replicated source data files; and in response to purging the data, automatically (1) updating the e-discovery file system to reflect that the data has been purged by creating a purge entry in a file system log that includes details of the data purge, and (2) updating metadata that is stored in an e-discovery system metadata database and associated with the purged files, to indicate that the data has been purged and is no longer accessible.

7. The method of claim 6, wherein determining the replicated source data files further comprises determining the replicated source data files within the e-discovery file that are associated with the purge-eligible cases and qualify for purging by scanning, by the computing device processor, the e-discovery system directory by folder name to identify folders having a predetermined naming convention.

8. The method of claim 6, further comprising identifying one or more exceptions to the one or more identified purge policies and wherein determining files further comprises determining the files that qualify for purging based on the identified purge policies and the one or more exceptions.

9. The method of claim 6, wherein creating the purge entry in the file system log further comprises creating the purge entry, wherein the purge entry includes identification of the data purged, date and time of data purge, identification of purge policy applied, and file system location of data purged.

10. The method of claim 6, wherein executing the current purge processing further includes, in response to purging the data, generating and initiation communication of a purge alert that notifies recipients of one or more of an identity of the data purged, a time at which the data was purged, an amount of data purged, an amount of storage capacity reclaimed.

11. A computer program product, comprising:

a non-transitory computer-readable medium having computer readable program code embodied therewith, the computer-readable program code comprising:

a first set of codes for causing a computer to determine one or more purge-eligible e-discovery cases by querying an e-discovery system metadata database with predetermined purge criteria to determine one or more purge-eligible cases;

a second set of codes for causing a computing processor to determine files within an e-discovery file system that are associated with the purge-eligible cases and qualify for purging based on identified purge policies by querying an e-discovery system metadata database with the purge policies, wherein the purge policies include at least (i) purging e-discovery work product data based on an associated case being closed, (ii) purging all data associated with a closed case after a predetermined period of time, and (iii) purging data stored at an external repository after a predetermined period of time;

a third set of codes for causing a computing processor to determine storage locations within the e-discovery file system associated with the files by querying an e-discovery system metadata database with the purge policies;

a fourth set of codes for causing a computer to determine replicated source data files within the e-discovery file system that are associated with the purge-eligible cases and qualify for purging by scanning an e-discovery system file directory to identify the replicated source data files that qualify for purging based on the one or more identified purge policies;

a fifth set of codes for causing a computing processor to purge data from (1) the storage locations within the e-discovery file system associated with the files, and (2) the replicated source data files; and a sixth set of codes for causing a computing processor to, in response to purging the data, automatically (1) update the e-discovery file system to reflect that the data has been purged by creating a purge entry in a file system log that includes details of the data purge, and (2) update metadata that is stored in an e-discovery system metadata database and associated with the purged files, to indicate that the data has been purged and is no longer accessible.

12. The computer program product of claim 11, wherein the fourth set of codes is further configured to determine the replicated source data files within the e-discovery file that are associated with the purge-eligible cases and qualify for purging by scanning the e-discovery system file directory by folder name to identify folders having a predetermined naming convention.

13. The computer program product of claim 11, wherein the second of codes is further configured to determine the files that qualify for purging based on one or more identified purge policies and one or more exceptions to the identified purge policies.

14. The computer program product of claim 11, wherein the sixth set of codes is further configured to cause the computer processor to create the purge entry, wherein the purge entry includes identification of the data purged, date and time of data purge, identification of purge policy applied, and file system location of data purged.

15. The computer program product of claim 11, wherein the computer-readable program code further comprises a seventh set of codes configured to cause a computing processor to, in response to purging the data, generate and initiate communication of a purge alert that notifies recipients of one or more of an identity of the data purged, a time at which the data was purged, an amount of data purged, an amount of storage capacity reclaimed.

* * * * *